(12) United States Patent
Hubbell, Jr.

(10) Patent No.: US 8,834,067 B2
(45) Date of Patent: Sep. 16, 2014

(54) OIL CONTAINMENT BARRIER BOOM FOR SHORELINES/MARSHES/WETLANDS

(76) Inventor: Paul Joseph Hubbell, Jr., Metairie, LA (US)

(*) Notice: Subject to any disclaimer, the term of this patent is extended or adjusted under 35 U.S.C. 154(b) by 63 days.

(21) Appl. No.: 13/135,111

(22) Filed: Jun. 27, 2011

(65) Prior Publication Data
US 2012/0009016 A1 Jan. 12, 2012

Related U.S. Application Data

(63) Continuation-in-part of application No. 13/068,983, filed on May 25, 2011.

(60) Provisional application No. 61/399,036, filed on Jul. 6, 2010.

(51) Int. Cl.
*E02B 15/06* (2006.01)
*E02B 15/08* (2006.01)

(52) U.S. Cl.
CPC ............ *E02B 15/06* (2013.01); *E02B 15/0835* (2013.01); *Y10S 210/922* (2013.01); *Y10S 210/924* (2013.01)
USPC ............ 405/63; 405/60; 210/242.4; 210/922; 210/924

(58) Field of Classification Search
USPC ................. 405/60, 63, 70, 64, 66; 210/242.1, 210/242.4, 922, 924
See application file for complete search history.

(56) References Cited

U.S. PATENT DOCUMENTS

| | | | |
|---|---|---|---|
| 5,195,843 A * | 3/1993 | George et al. | 405/63 |
| 2001/0027952 A1 * | 10/2001 | Ciancaglini et al. | 210/660 |
| 2002/0008071 A1 * | 1/2002 | Chinn | 210/767 |
| 2002/0131827 A1 * | 9/2002 | Spangler et al. | 405/302.6 |
| 2005/0254899 A1 * | 11/2005 | Tyler | 405/15 |
| 2006/0000767 A1 * | 1/2006 | Trauger et al. | 210/503 |
| 2009/0266767 A1 * | 10/2009 | McInnis et al. | 210/688 |

* cited by examiner

*Primary Examiner* — Benjamin Fiorello

(57) ABSTRACT

Two embodiments (FIGS. 1 through 6) of a system design and methods of the apparatus utilizing the properties of Bermuda Straw, rectangular bales, encased in biodegradable burlap fabric to render an environmentally friendly oil containment vehicle/product to block, deter, arrest, capture, filter, absorb and detoxify contaminants, such as oil from drilling spills, and/or leaks from pipe lines and other sources to prevent intrusion into and on the shorelines of coastal areas oceans, lakes, rivers, waterways and beaches. The second preferred embodiment (FIGS. 6A through 11B) incorporates the inclusion of filter rack frames to the basic design and methods of the first preferred embodiment that enhances the process of oil containment and prevention of intrusion with oil blanket filters. A third preferred embodiment: (FIGS. 7A through 11A) incorporates the use of (1") Cork Board and (FIGS. 7B through 11B) utilizes (2") Cork Board or (2-1" Cork Boards) to the modules base/bottom for buoyancy, depending on the depth of the water near the shorelines, as needed.

2 Claims, 30 Drawing Sheets

TWO MODULES CONNECTED

EXTENDING A BARRIER OF BOOM

WIRE OR EQUAL FILTER FRAME

FILTER FRAME

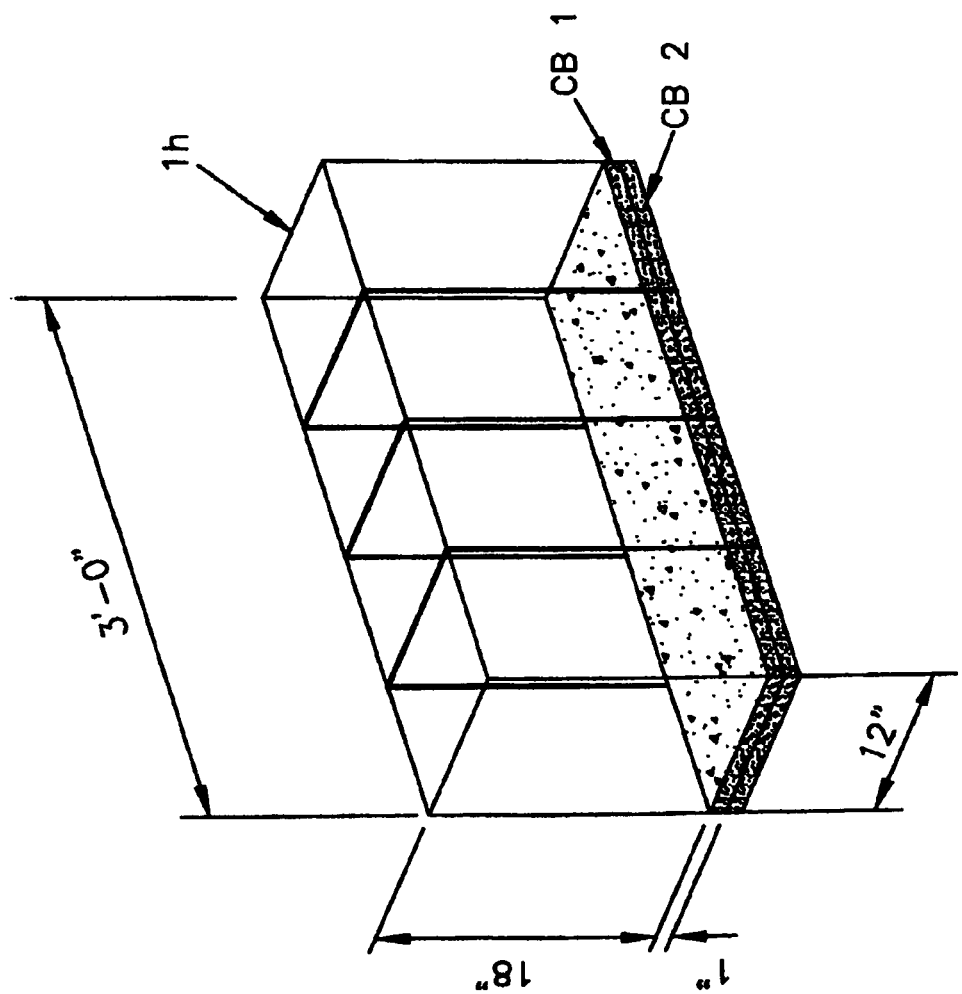

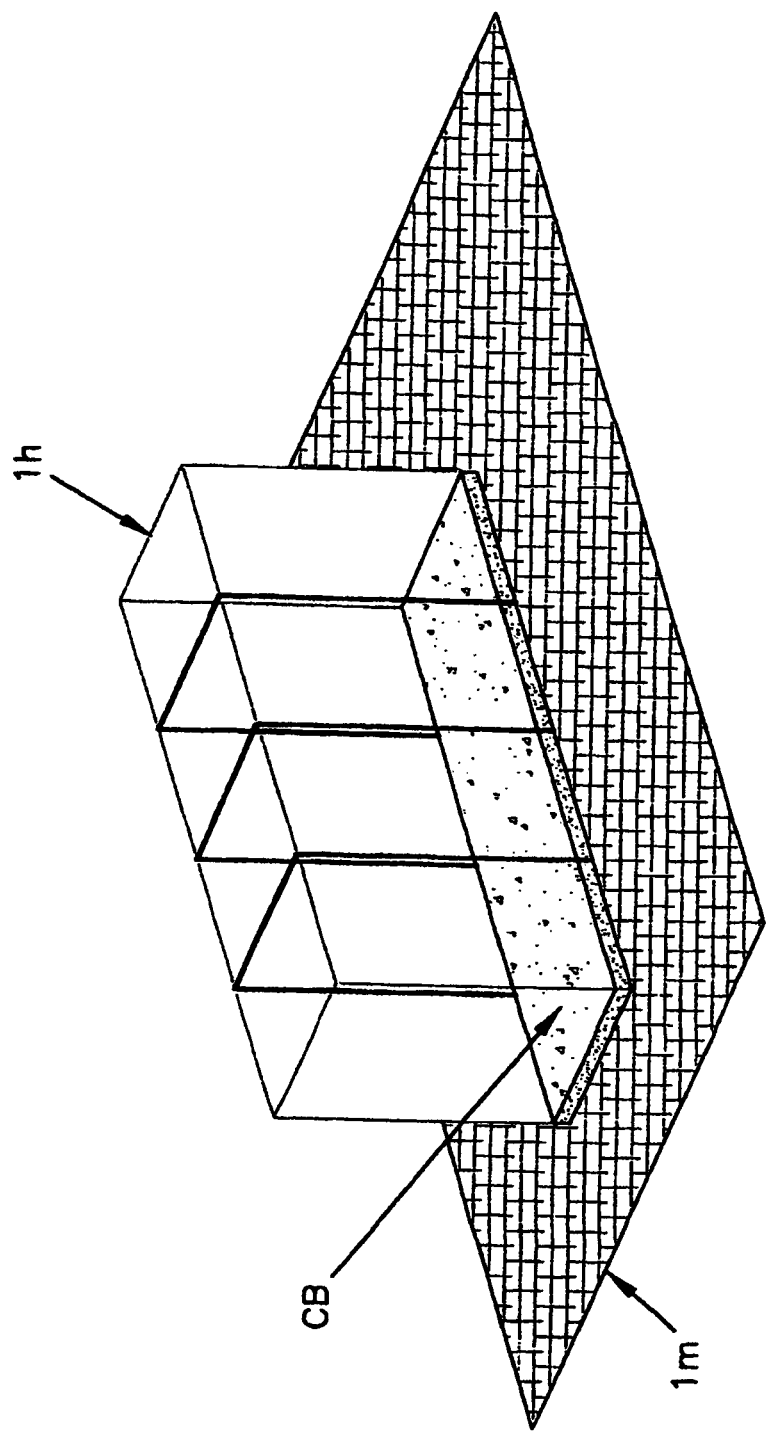

VERTICAL WITH FILTER FRAME

FILTER FRAME

VERTICAL CENTER VIEW WITH EXTENDED FILTER FRAME

VERTICAL WITH FILTER FRAME

VERTICAL WITH FILTER FRAME

VERTICAL CENTER VIEW WITH EXTENDED FILTER FRAME

OIL CONTAINMENT BARRIER BOOM FOR SHORELINES/MARSHES/WETLANDS

REFERENCE TO RELATED DISCLOSURES

The present Utility Patent Application includes and is a Continuance-in Part (CIP) of Utility patent application Ser. No. 13/068,983, filed on May 25, 2011. Additionally, this new Utility Patent Application, also claims the benefit of Provisional application 61/399,036 filed on Jul. 6, 2010.

The combined Utility Patents/Applications of Ser. No. 13/068,983, referred to as the First Preferred Embodiment and the CIP of the new Application, herein, is classified as the Second Preferred Embodiment or Boom II and is an extension of the First Preferred Embodiment, or Boom I.

The First Preferred Embodiment application Ser. No. 13/068,983 has a Projected Publication Date of: Dec. 1, 2011.

A Certificate of Mailing and a self addressed Post Card Receipt are included.

LEGEND FOR ACCESSORIES

Boom II (1b) Burlap (biodegradable 10 oz,) fabric
(ff) Wire filter frame epoxy coated/painted steel 11 ga. Vertical, 10 ga. Horizontal *or Equal DelPore™ mesh
(1f) Fence posts—steel painted ⅛"×2"×7 ft. sections (×2 for 14 ft. extensions)
(1t) 4 in. Teflon ties, 18 lb. test
(3s) Teflon straps, 24 in., 175 lb. test
(1s) Teflon straps, 36 in., 175 lb. test
(1s) Teflon straps, 48 in., 175 lb. test * optional
Nylon/polypropylene 5/32' cord, 50 lbs. test
Oil Only Natural Filter Pads/Blankets
Methods of Application, Installation and Disposal Referring back to the methods of manufacture in the parent application which are the basic fundamental criteria taught and described along with the methods of installation and operation as well as illustrated in the drawings, FIGS. 1 through FIG. 6 and are the necessary procedures to develop further into the following second preferred embodiment and third preferred embodiment, resulting in the Oil Containment Barrier Boom of the CIP application offered, herein.

Each individual straw/burlap module 1m, that has been constructed for use as the primary, first preferred embodiment, which is basic to produce up-grading to the improvement barrier products, and has been secured/fastened with PTFE straps, 3s, then progresses to having a hinged 1t double wire, or equal, filter frame ff attached as shown in FIGS. 6A and 7 by connecting/fastening the filter frame to the module 1m, with PTFE ties 1t, to the strapping/fasteners securing the module The next step is to insert and secure the filter media/oil blanket, or equal, fm to the filter frame 2ff with PTFE ties 1t.

Obviously, to create a continuous row/chain wall effect, each individual module will have to be constructed in a similar fashion as the above, to be adjourned to another (next) module.

After determining and selecting the appropriate Boom for the shoreline/shoals of the marshes, canals and/or bayou's, the installation begins with transporting the materials and modules by shallow draft boats or mini barges.

In the application of the Boom with the filter media module of the second preferred embodiment FIG. 8A, pre-assembled as illustrated in FIG. 7 through FIG. 9E, a determination is made whether the single module 1m of FIG. 8, 8A or 9-9C should be installed independently or in groups of two or more that will form a chain wall effect as described in the first preferred embodiment, of the basic barrier boom apparatus.

The next step is for a small shallow draft flat boat or skiff to transport the anchoring components, steel or wooden fence posts 1f to the desired location of installation, position and set same into locations next to/adjacent to, the shorelines by either performing this task from the boat and/or on the shoals that have no grasses without penetrating the marsh/wetlands that could cause damage from working, walking or trampling on same.

The modules can be transported on pallets in three foot lengths or (six foot lengths for two connected modules) to the installation sites.

Following the placement of the anchoring devices 1f, the modules are loaded on a flat boat and/or mini shallow draft barge which is equipped with a portable/adjustable crane that can spot the single module FIG. 10-10B or 11-11B, a unit of two or more modules 2m or 3m, for the installation crew to connect and secure to the anchoring device 1f by means of PTFE, 3s strapping and/or nylon cord through the holes in fence posts which prevents lateral or vertical shifting from the impacts of waves/tides with only moderate allowances for same.

Depending on the soil conditions, the depth of the of the anchoring fence posts 1f (7 ft.) could require additional 7 ft. extensions which are easily aligned with the manufactured holes, then bolted. The same multiple manufactured holes in the center of the fence posts are also available and used as attachment devices of the modules 1m to the fence posts 1f utilizing PTFE straps 1s or 3s as needed.

The methods of manufacture, application, installation and disposal for the first, second and third preferred embodiments apply to the basic fundamental criteria which includes a Bermuda straw bale (1h) as the primary starting component as illustrated in FIG. 11A and is included in all the following progressions/products: FIGS. 1-6A and 7-11B.

As described, above, in the methods of installation, the use of shallow draft boats and/or mini barges would also be utilized in the replacement or removal process. The boats mounted with portable cranes and shredders with the assistance of the small skiff crew would disconnect and remove the modules from their anchors 1f and filter frames ff and proceed to the desirable selected sites of the wetlands/marshes whereby the recycling process involving the disposal of the used detoxified and nutrient laden modules can be implemented, either whole or shredded, and blown further into the terraces of the marshes without the trampling of crews manually transporting, dragging same across the grasses. For further penetration deeper into the areas, helicopters can drop the modules from baskets, This procedure utilizes the recycled straw for a base foundation of compost for the pumped in river sediment projects that will cover and enhance the growth and redevelopment of these coastal wetlands that have been eroding from subsidence, tidal surges from storms and hurricanes along with rising sea levels for hundreds of years.

BRIEF DESCRIPTION OF DRAWINGS

FIG. 7B Displays the position of a 2 in. corkboard base relative to the straw bale, 1*h*, strapped and prepared for the next step of assembly, rapping and sewing.

FIG. 7C Shows the placement of the module in FIG. 7A onto a predetermined/cut-to-size, section of burlap fabric for wrapping and sewing stages.

Figure 1:
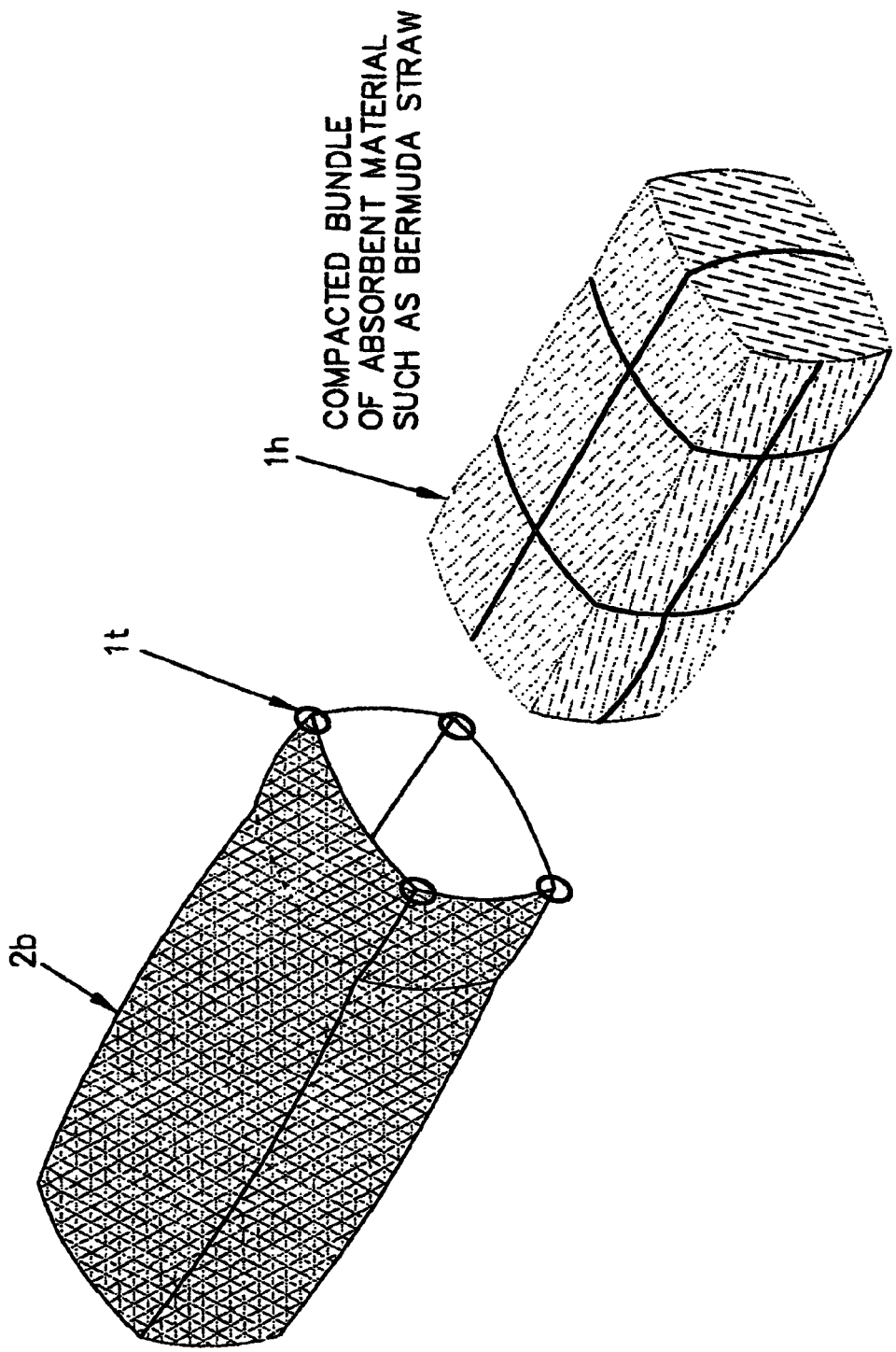
FIG. 1 Illustrates the physical dimensions of a standard bale of Bermuda Straw, raw as shipped, baled and aligned to be inserted into a biodegradable burlap receptacle/bag as it is being prepared to be sewn and enclosed with one end closed as a gusset and the opposite end with a one foot loose overlap of the burlap in order to accommodate another bale/module in order to be joined/connected to form a section of a chain wall barrier.
Figure 2:
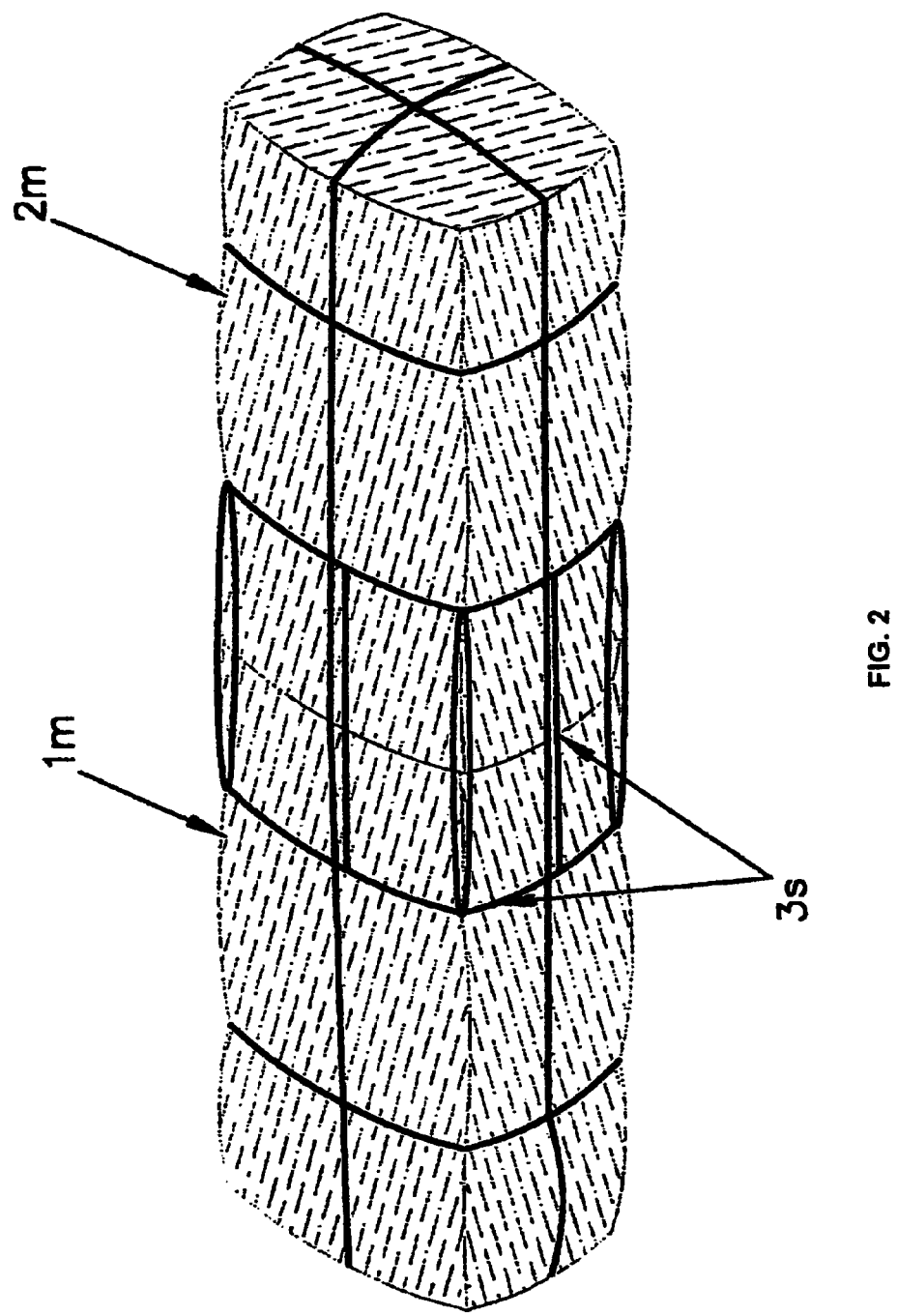
FIG. 2 Shows two bales/modules connected and secured with PTFE reinforced straps at the joint as well as the entire new section of the extended module bound also both vertically and horizontally and strapped.
Figure 3:
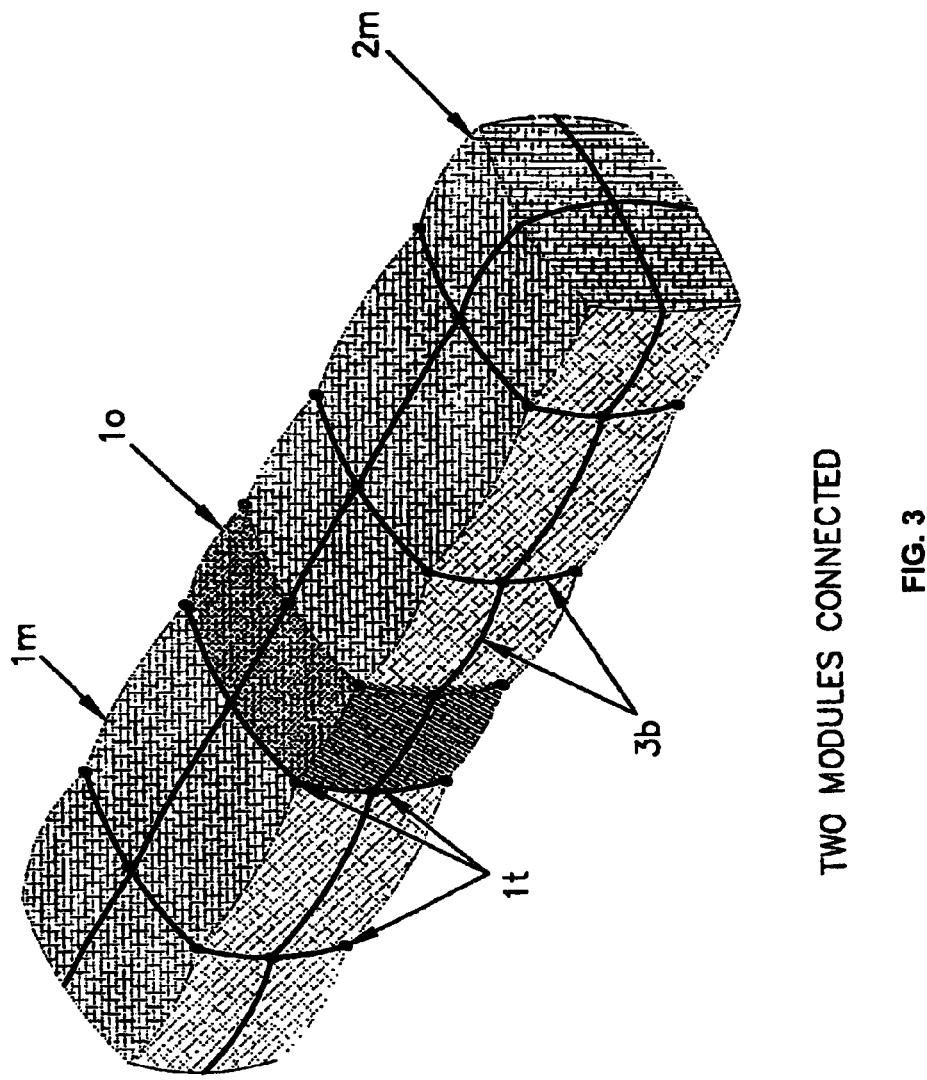
FIG. 3 Depicts the connected two bales/modules with a covered overlap of biodegradable burlap material secured to each adjacent edge via PTFE ties creating an approximate one foot section split evenly forming a continuous covering for that new extended module.
Figure 4:
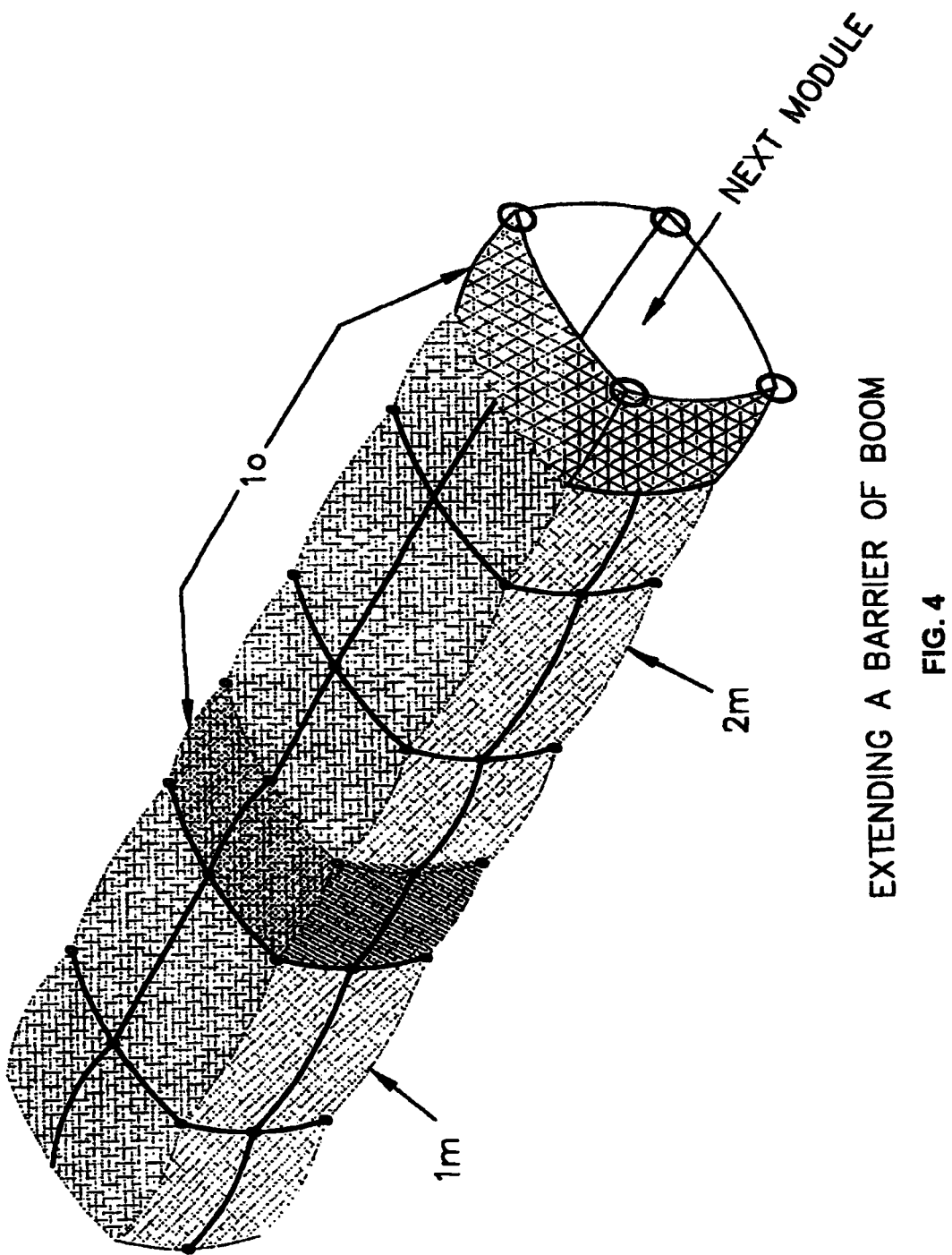
FIG. 4 Illustrates the newly formed extended module with the covered joint and secured strapping with the one foot overlap extension of the biodegradable burlap sack with PTFE ties ready to accommodate another section with a closed/gusset end for further extension of a barrier wall, as needed, and preparing for the process of anchoring same to the selected steel or wooden fence posts, securing same to adhere to the contour of the landscape shorelines.
Figure 5:
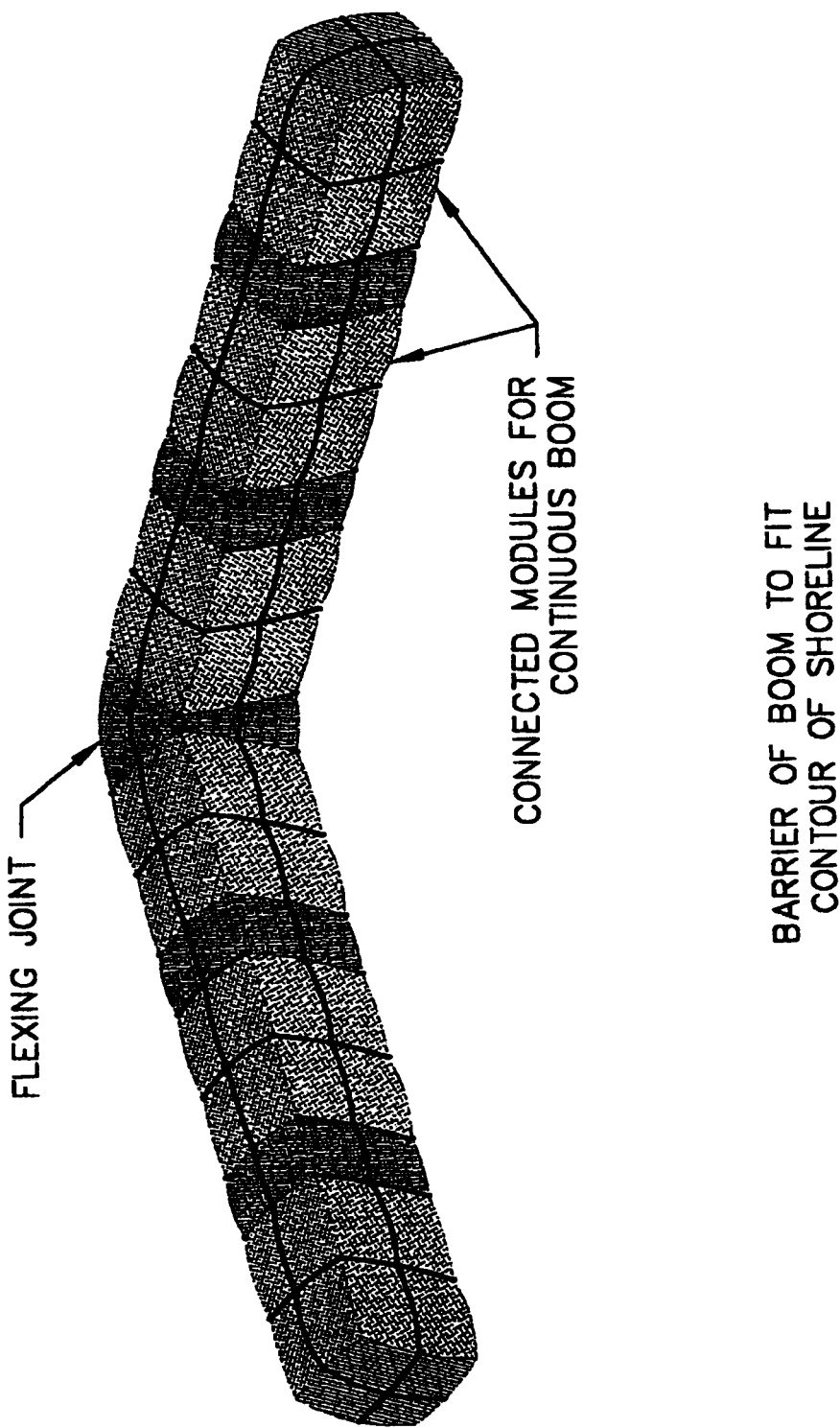
FIG. 5 Shows a typical, extended, section of barrier boom for an offset contour simulation of wetland shoreline/shoals.
Figure 6:
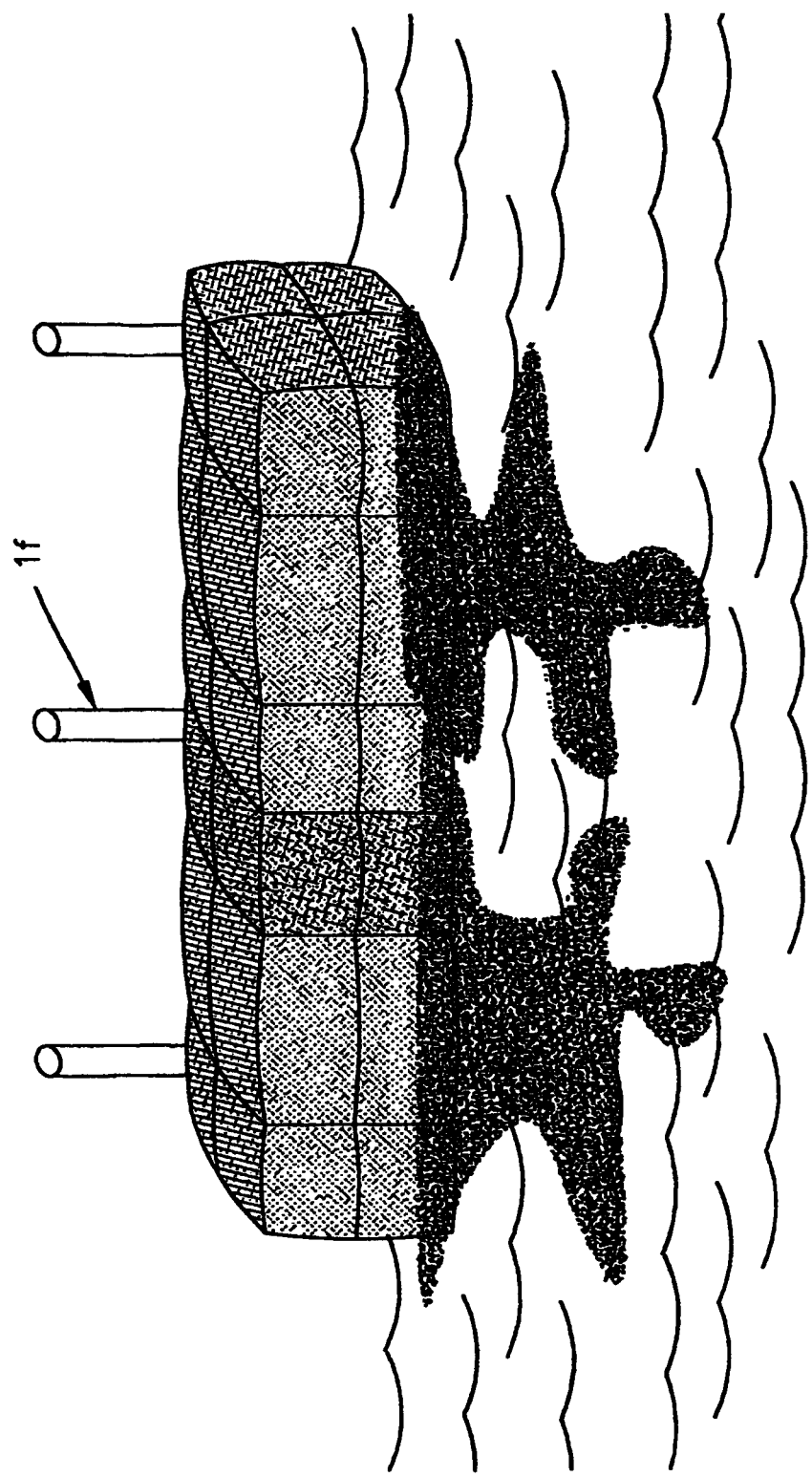
FIG. 6 Illustrates a simulation of a section of apparatus/modules connected together and anchored, adjacent to the shoreline of the wetland marshes, to fence posts.
Figure 6A:
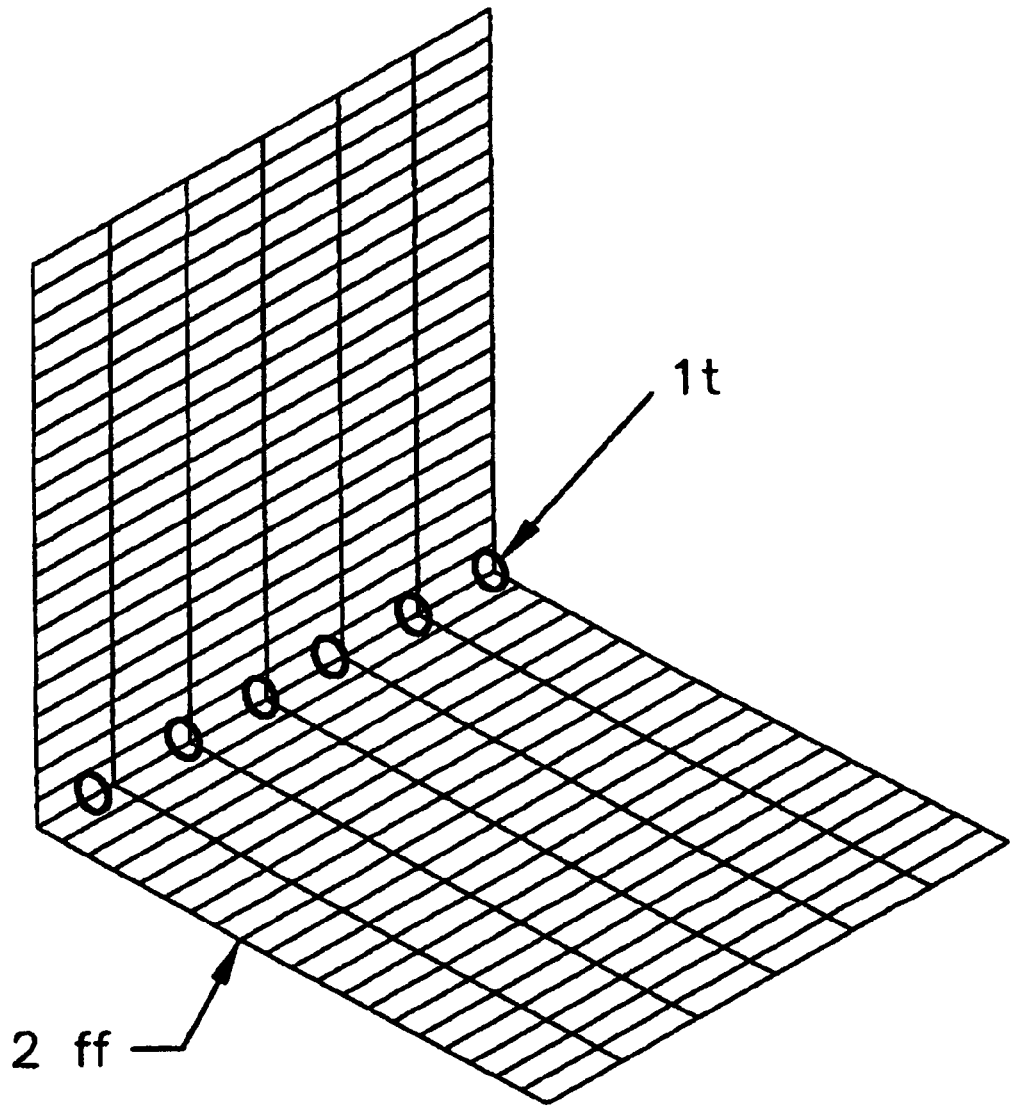
FIG. 6A Of the Second Preferred Embodiment, illustrates the wire or equal, hinged filter frame rack that consists of two like size sections connected by PTFE ties which allows varying degrees of extended openings from fully closed to fully open vertically (180 degrees), and is capable of housing one and/or two filter pads which is optional, depending on the application.
Figure 7:
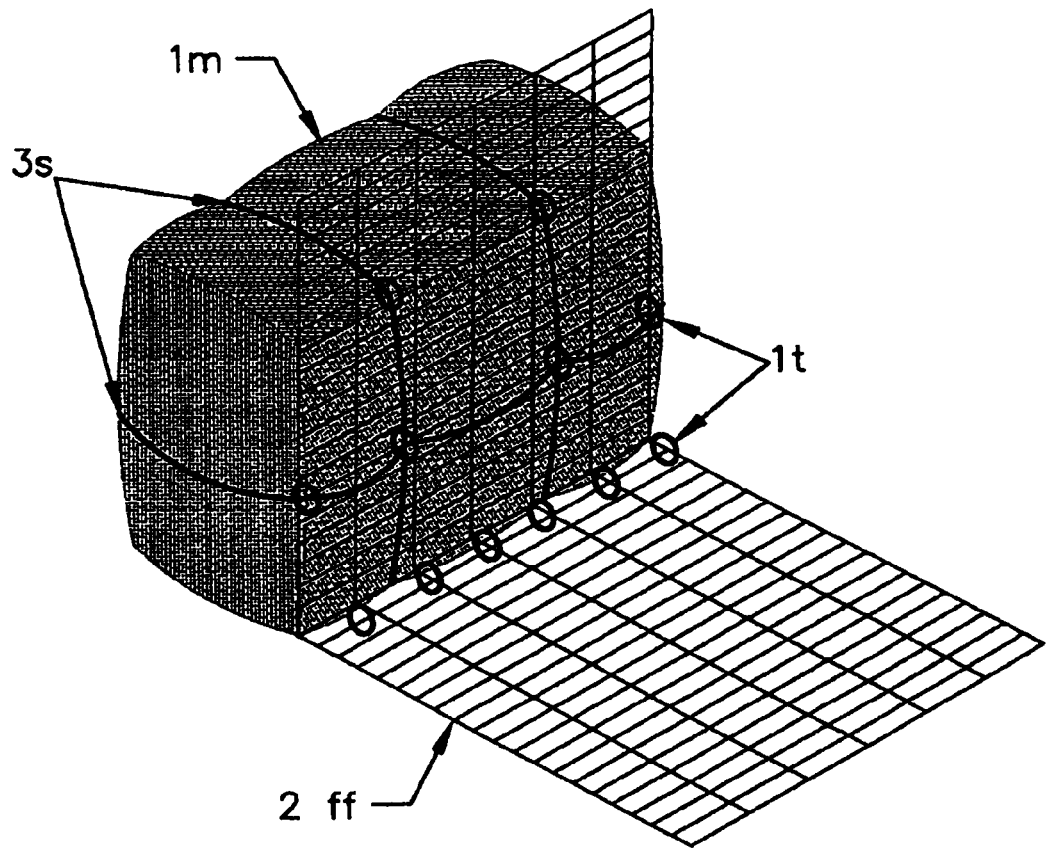
FIG. 7 Illustrates the filter frame shown in FIG. 6A with one half of the vertical rack attached to a typical straw bale module that is strapped/contained by PTFE strapping and connected to by means of PTFE ties while depicting an open/adjustable position.
Figure 7A:
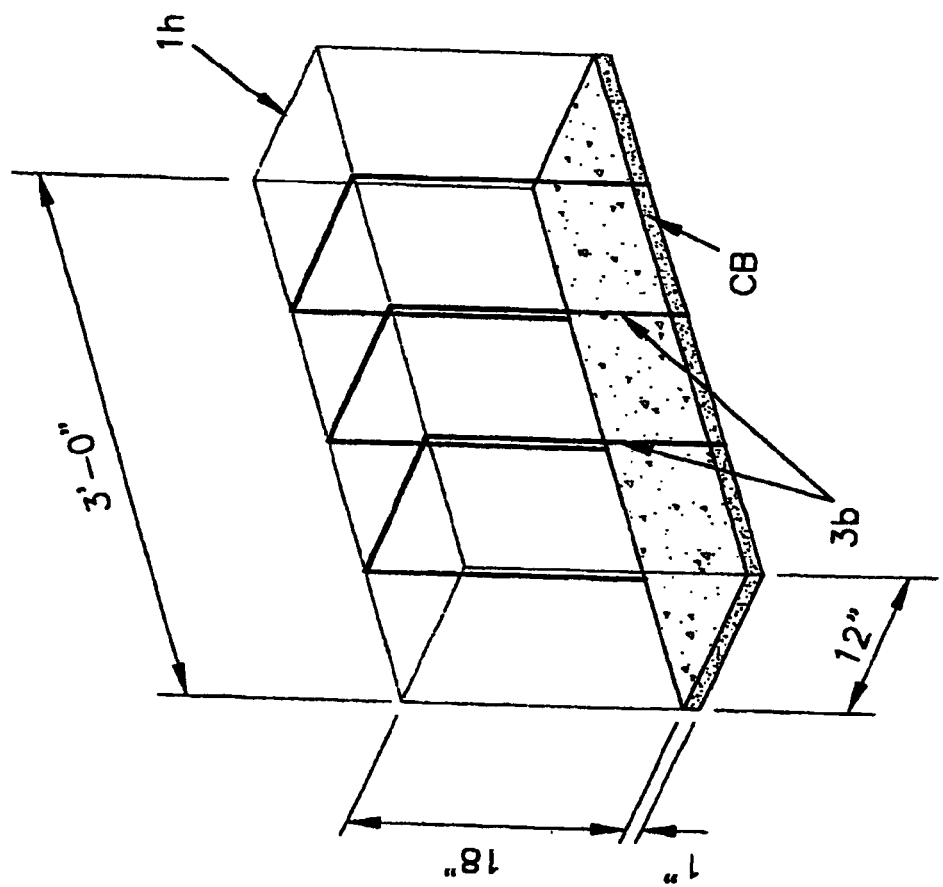
FIG. 7A Depicts the position of a 1 in. corkboard base in relation to the position of the straw bale, 1*h*, with PTFE straps installed for the first step of assembly.
Figure 7D:
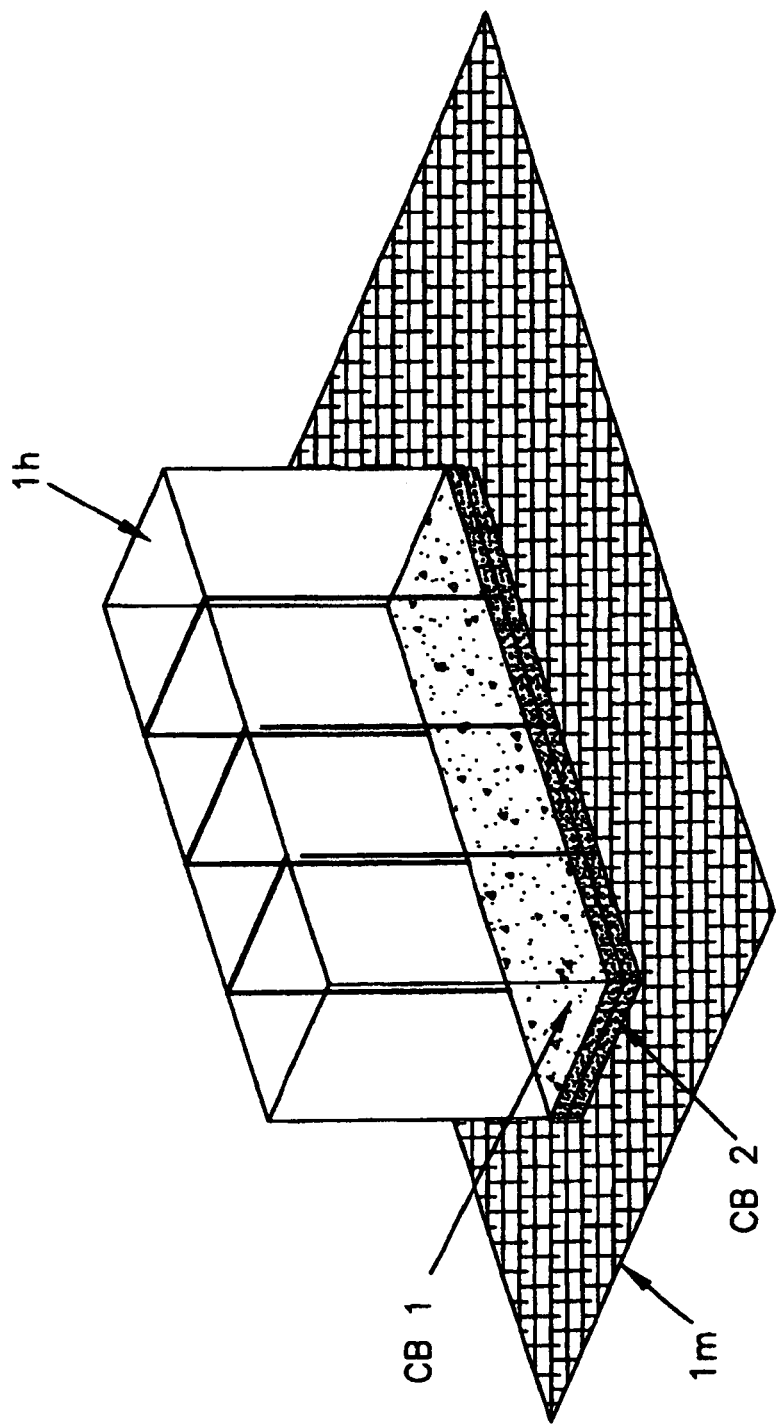
FIG. 7D Displays the placement of the straw bale module, 1*h*, module shown in FIG. 7B onto the premeasured/cut to size, section of Burlap fabric for wrapping and sewing.
Figure 8:
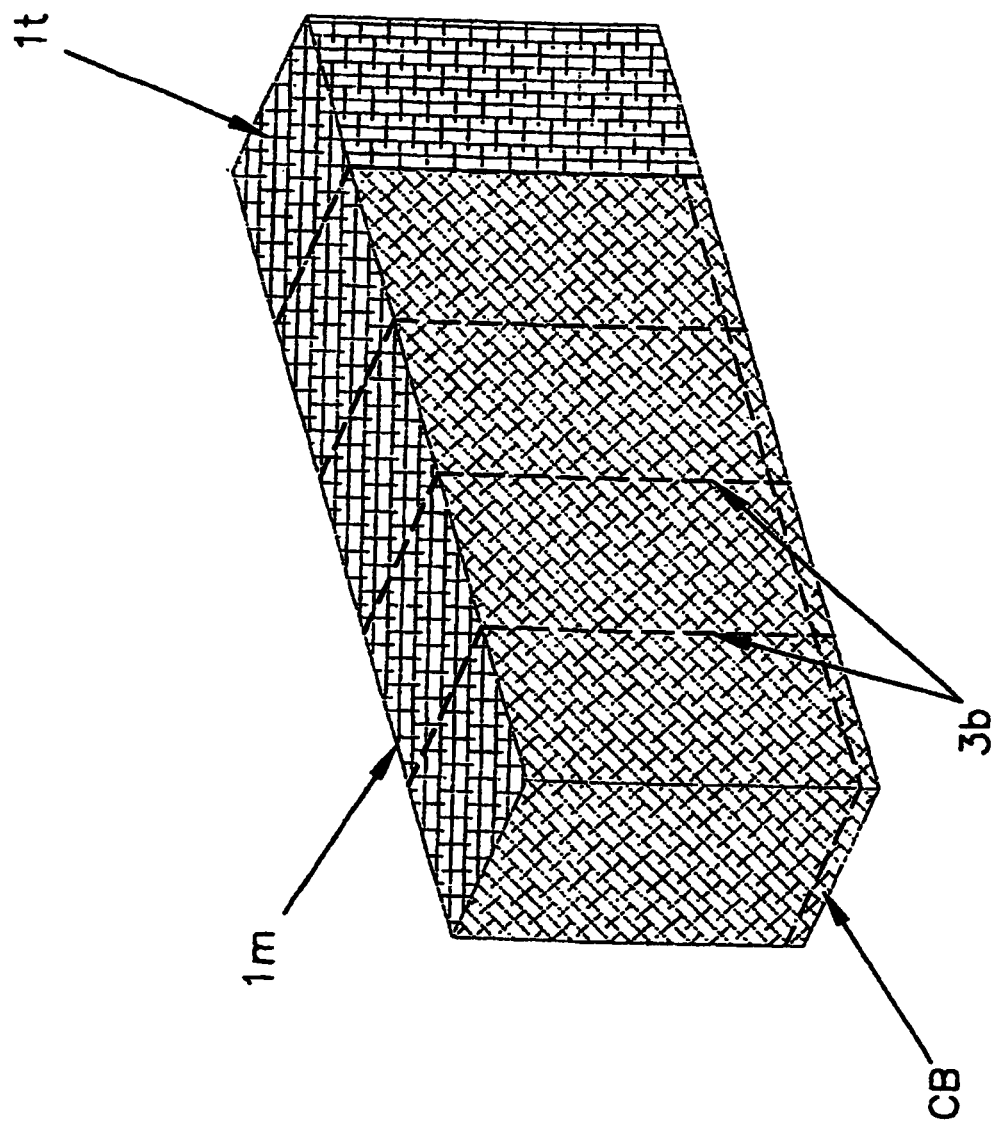
FIG. 8 Illustrates the completed wrapping, sewing of the apparatus/module 7C, with one end closed/gusset and the opposite end with a one foot loose extension of Burlap for connection to an adjacent apparatus module.
Figure 8A:
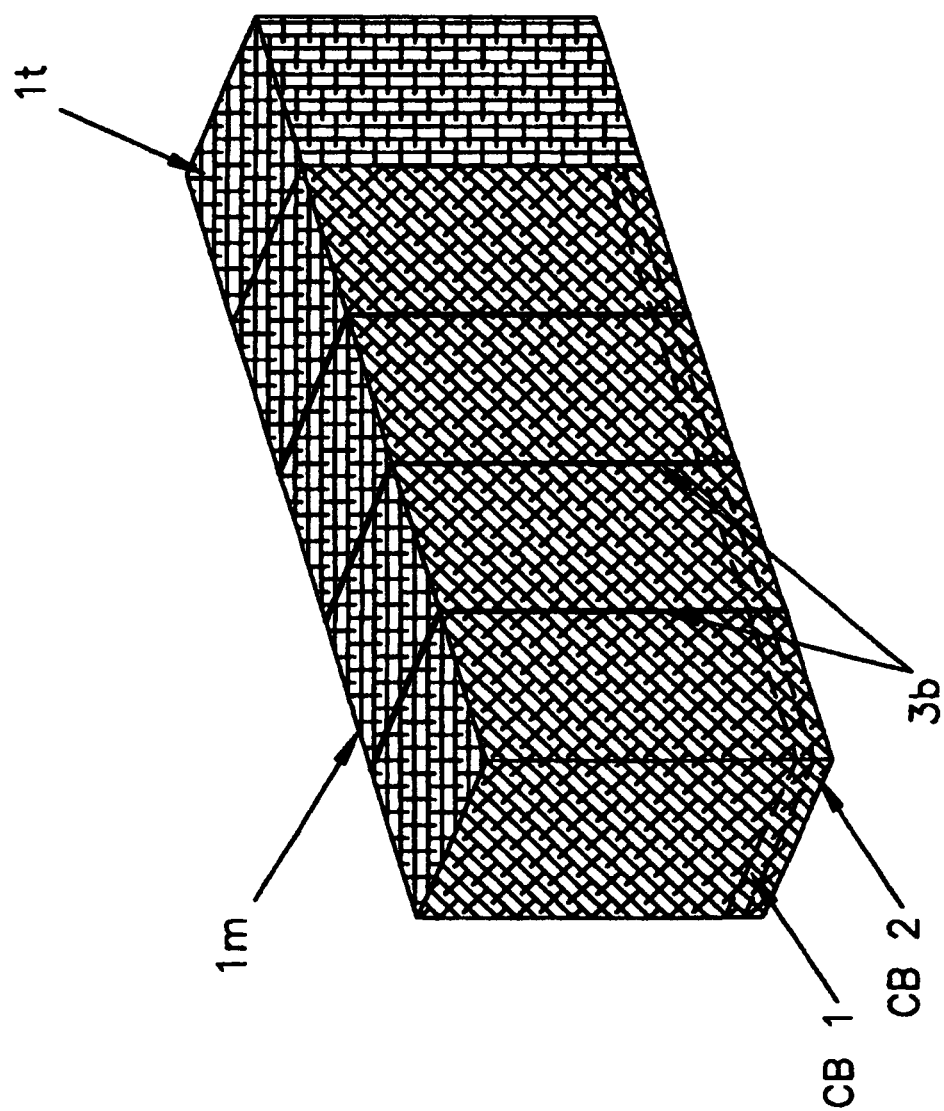
FIG. 8A Shows the completed wrapping/sewing of the apparatus/module in FIG. 7D with 2 in. corkboard base and one end closed/gusset while the opposite end has a one foot, loose Burlap extension for coupling/attaching to another module/apparatus.
Figure 8B:
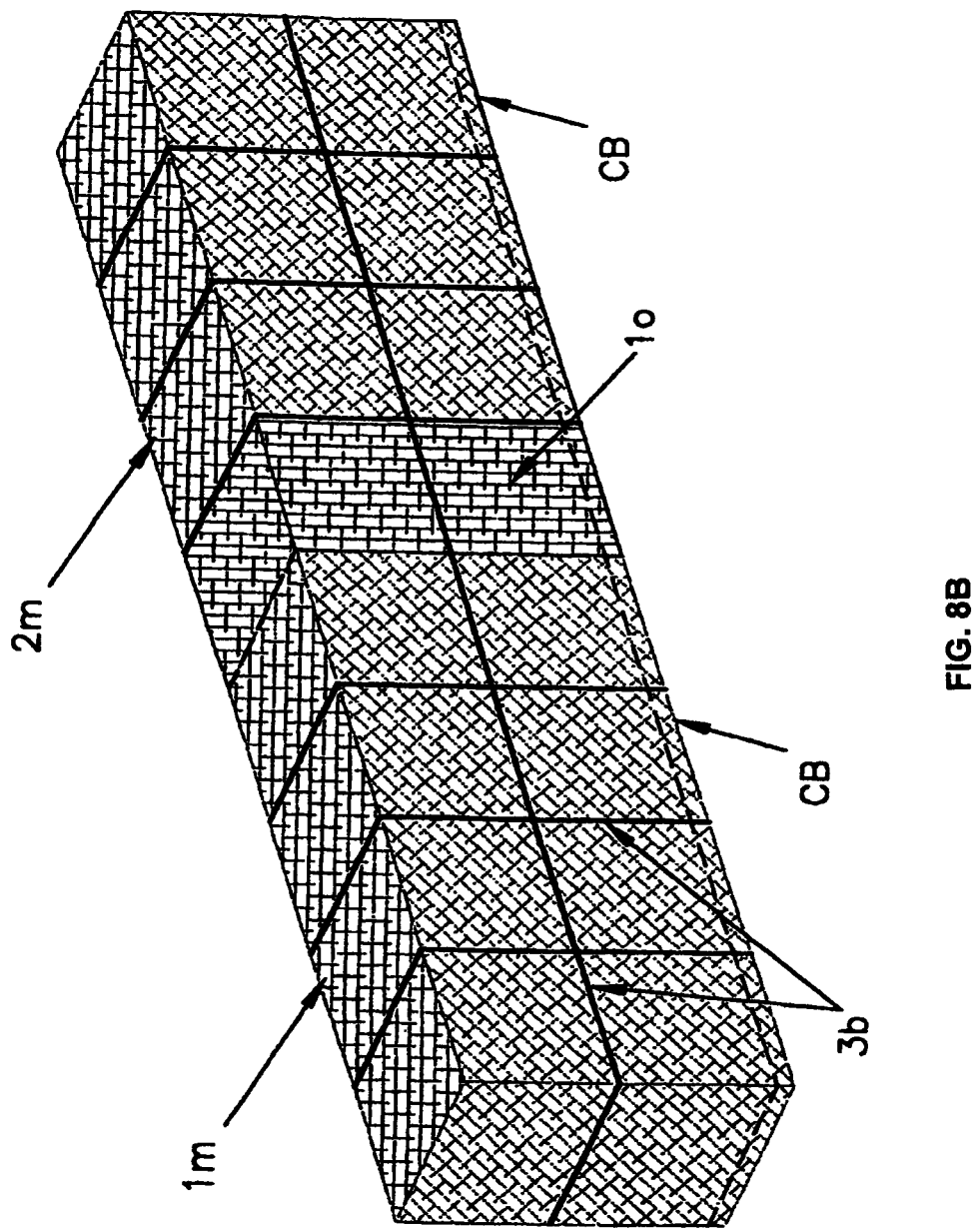
FIG. 8B Depicts the completed process of joining two apparatus/modules with external, horizontal and vertical PTFE strapping, ready for shipping and/or installation.
Figure 8C:
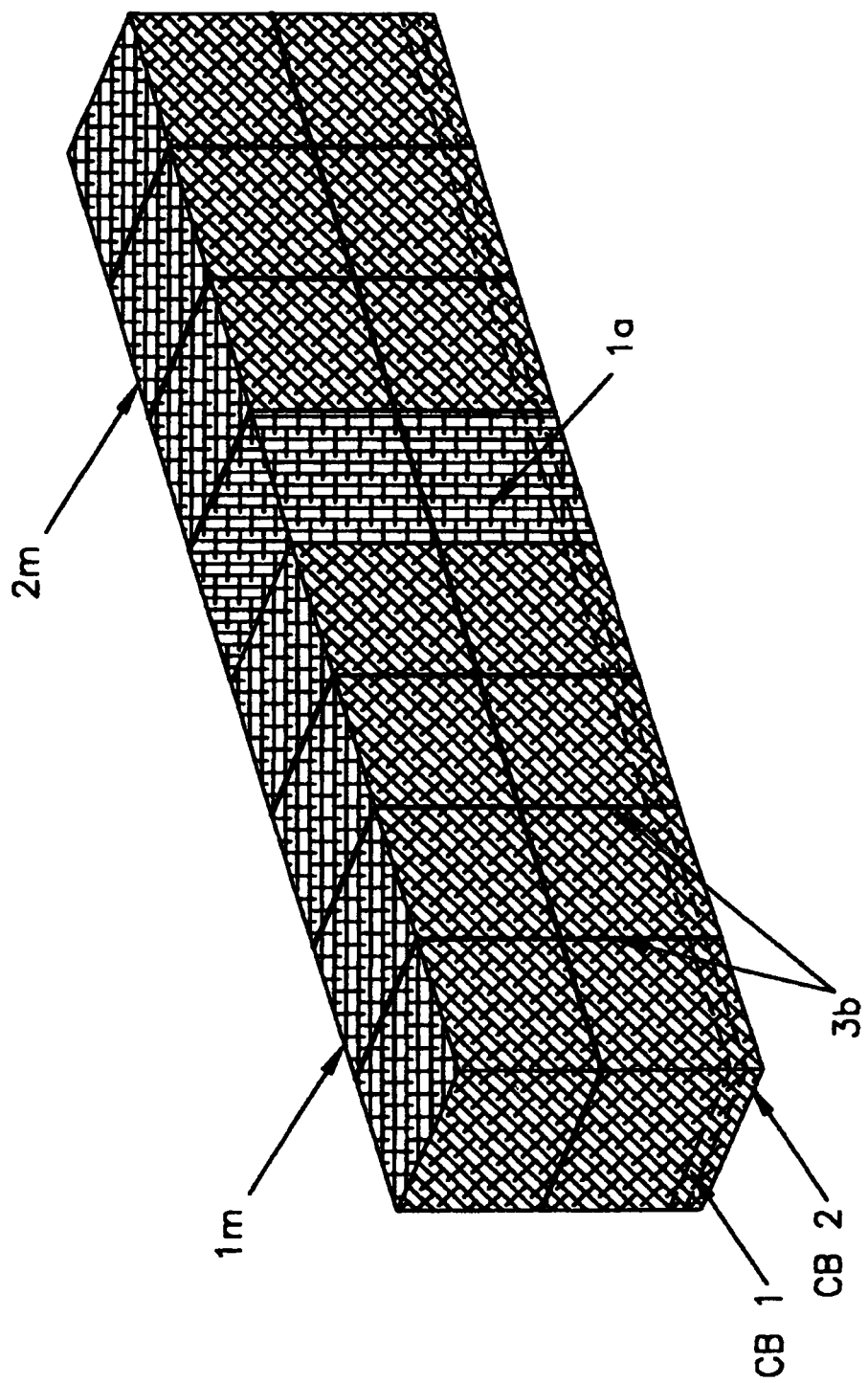
FIG. 8C Illustrates two modules connected with external horizontal and vertical straps with both CB-1 (1 in.) and CB-2, ready for shipping and/or installation.
Figure 8D:
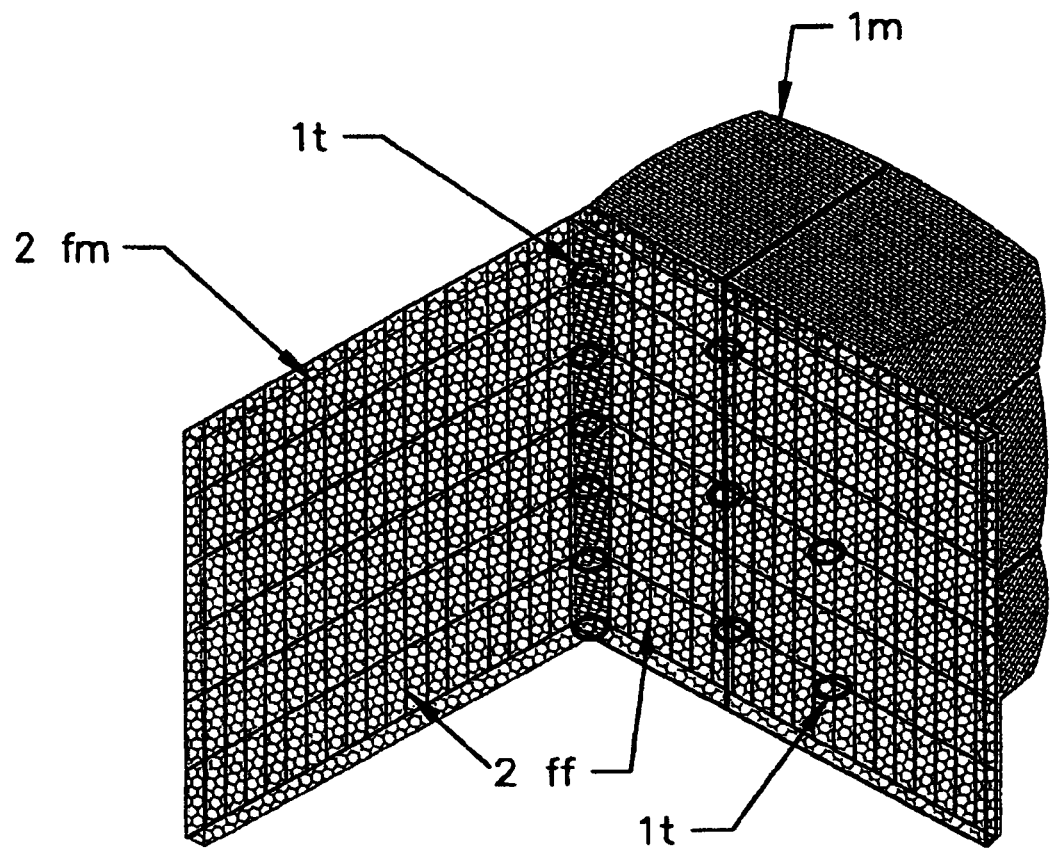
FIG. 8D Shows a vertical/center view of an apparatus/module with a filter/oil pad attached to each respective section of the filter frame in an open/extended position.
Figure 8E:
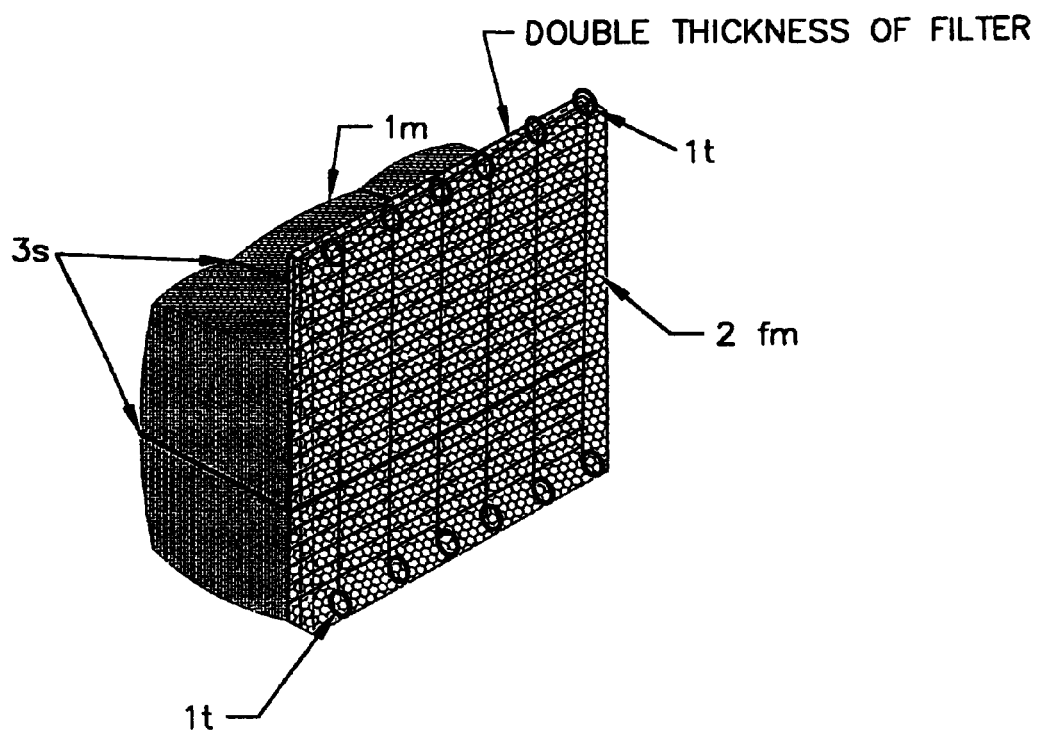
FIG. 8E Illustrates the filter frame with filter/oil pads in both sections in a closed vertical position, thereby forming a double thickness of filter material, when desired and no corkboard bottom necessary for certain applications.
Figure 9:
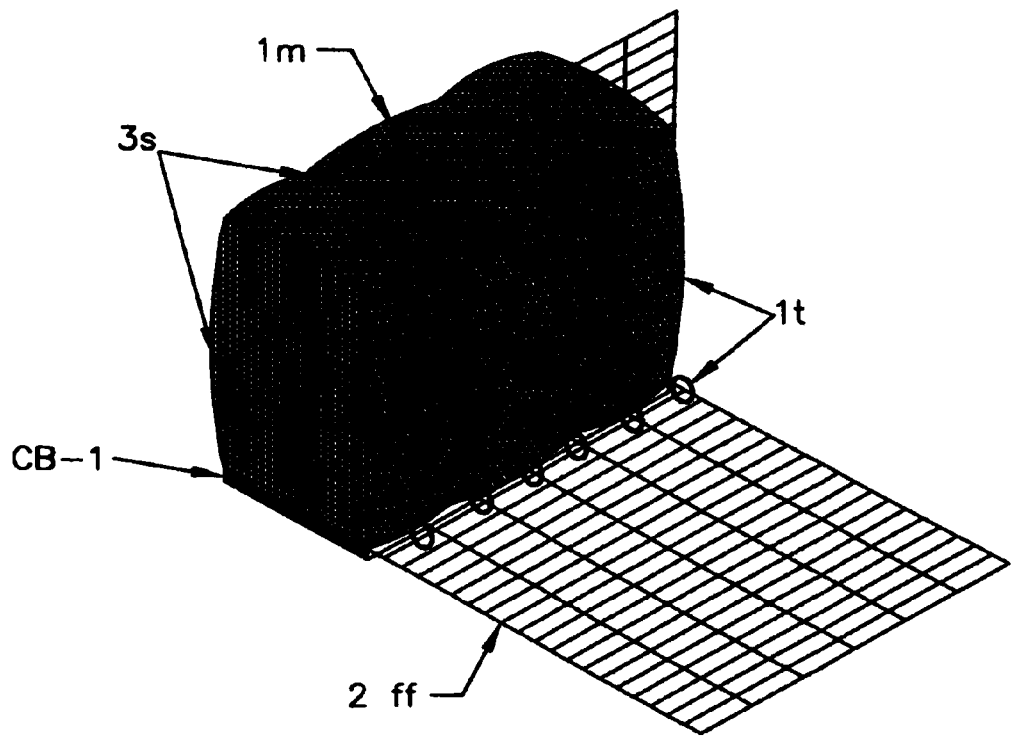
FIG. 9 Displays the apparatus/module presented in FIG. 7 with filter frame attached including a 1 in. corkboard base/bottom for desired applications, requiring single and/or double filter/oil pads.
Figure 9A:
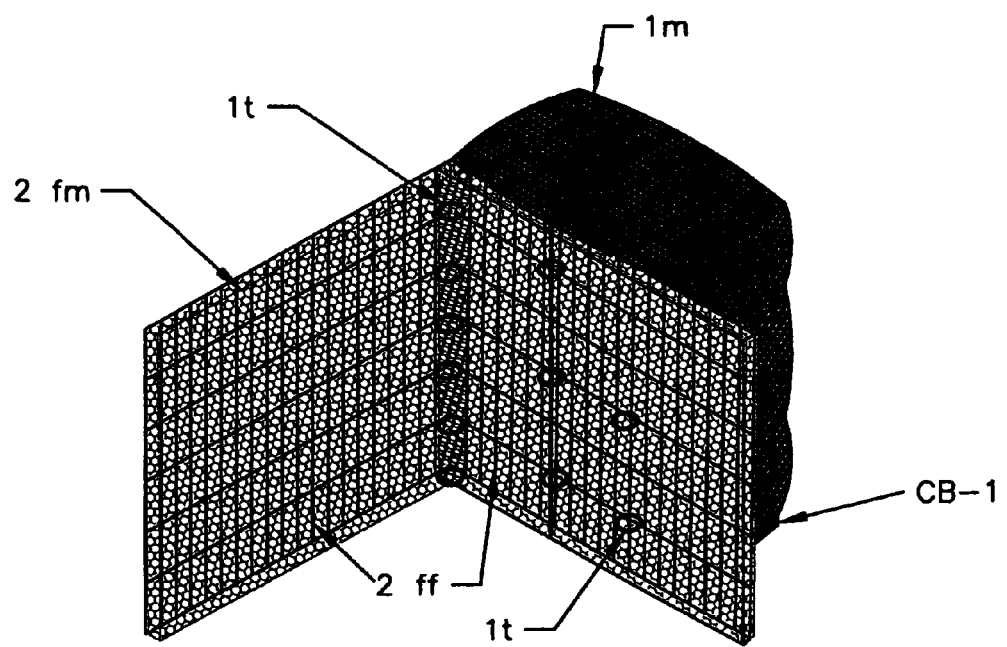
FIG. 9A Shows a vertical/center view of the apparatus/module with open/extended filter rack and filter/oil pads in both sections as well as a 1 in. corkboard base.
Figure 9B:
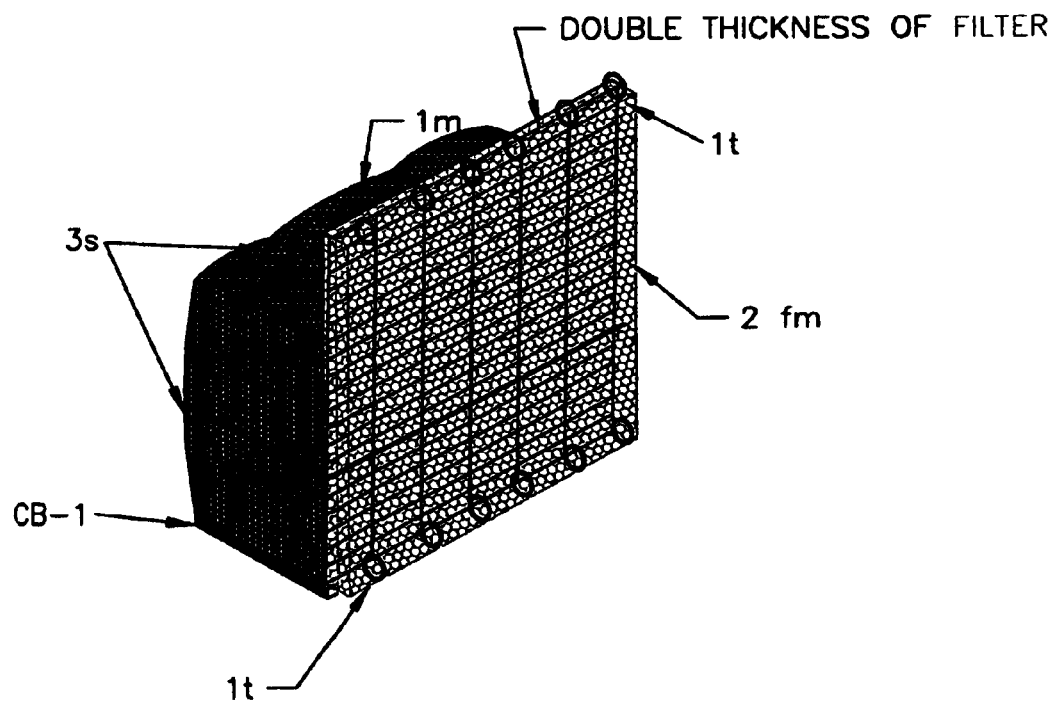
FIG. 9B Depicts a vertical apparatus/module with filter frame attached in a closed position holding a filter/oil pad in each section, forming a double thickness for desired applications and includes a 1 in. corkboard base.
Figure 9C:
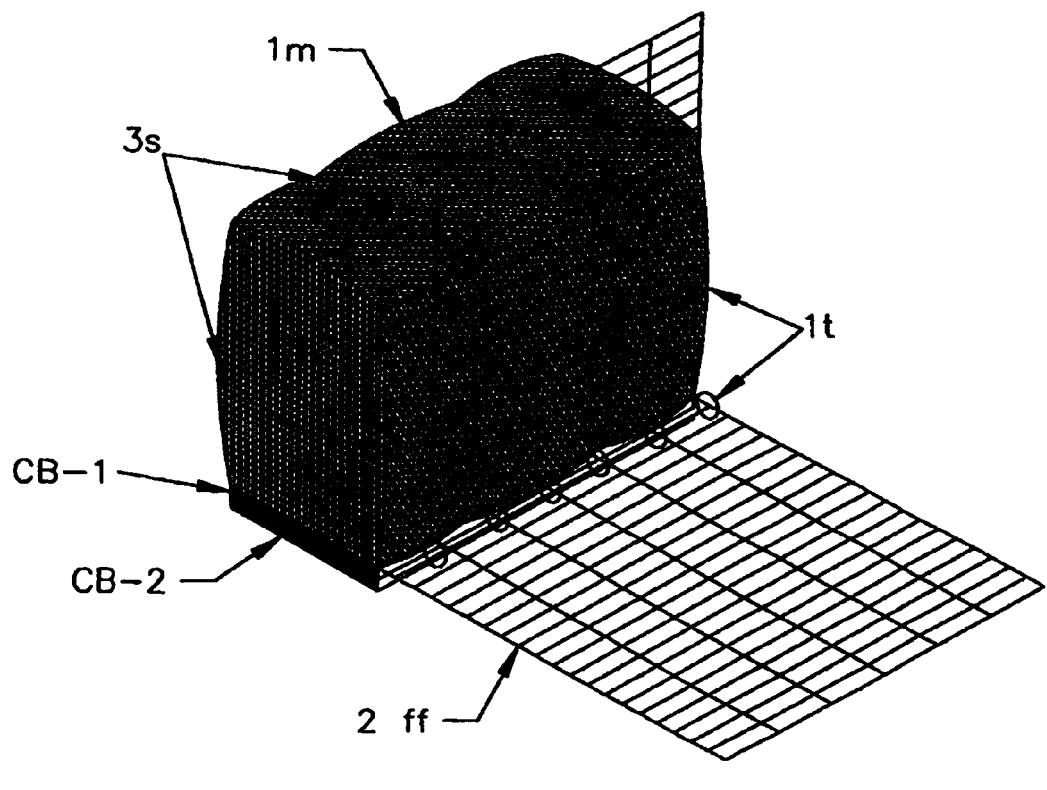
FIG. 9C Shows a vertical application of the module/apparatus with wire filter frame attached for optional uses and includes (CB-1) and (CB-2) corkboard bases.
Figure 9D:
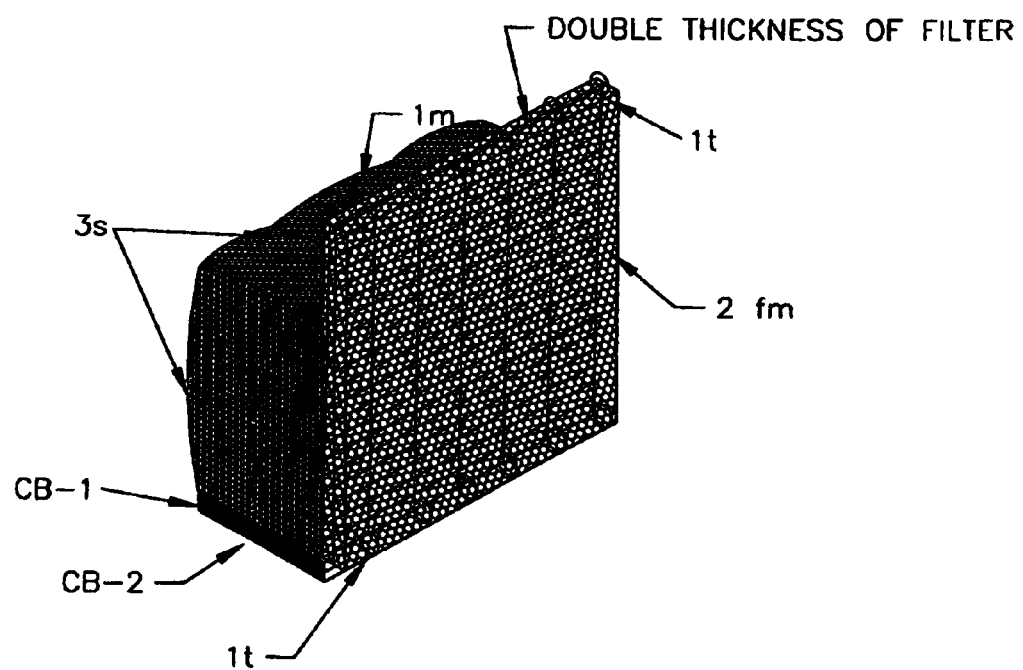
FIG. 9D Displays a module/apparatus in a vertical position with filter frame attached in a closed position with filter/oil pads in each section thus forming a double filtering process while including both a CB-1 (1 in.) and CB-2 (2 in.) corkboard base bottom.
Figure 9E:
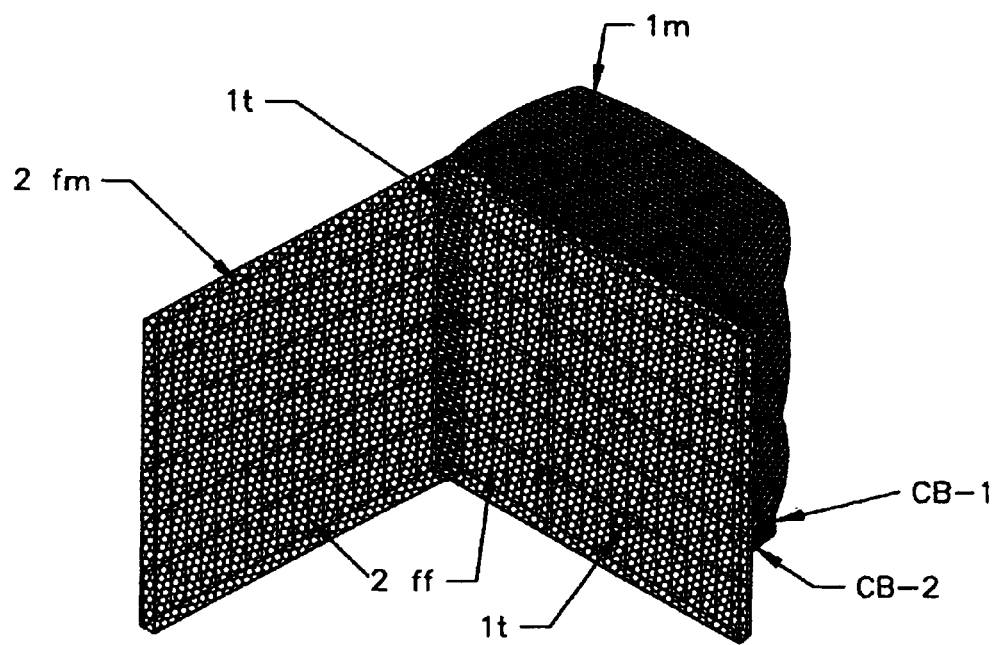
FIG. 9E Illustrates a vertical module/apparatus application with open/extended filter frame attached, employing a filter/oil pad in each section and both CB-1 (1 in.) and CB-2 (2 in.) corkboard base bottom.
Figure 10:
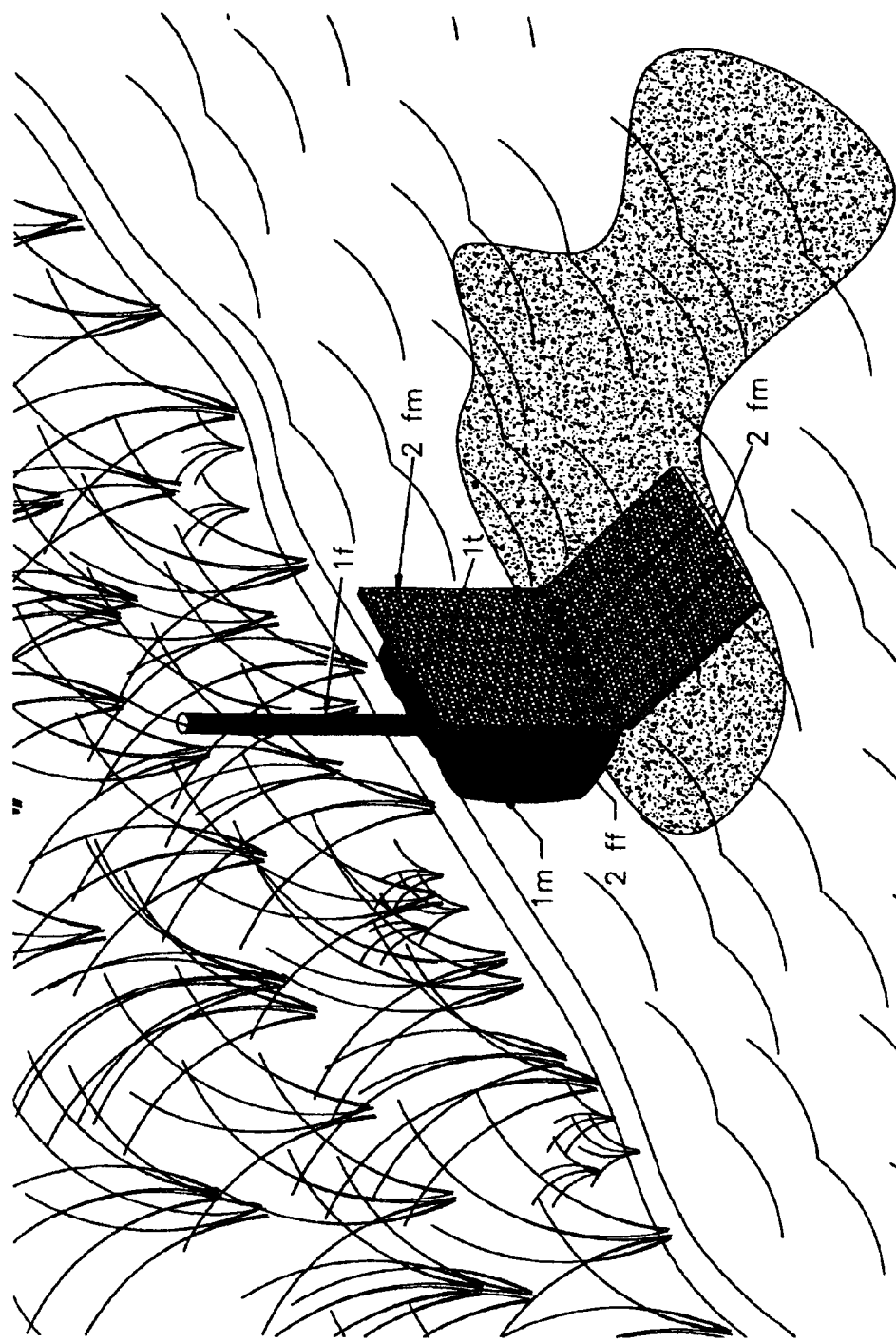
FIG. 10 Shows apparatus/module with filters in both sections of filter rack while resting on the shoals of the wetlands, opened with the bottom section resting on the slope of the shallow water bottom to collect, filter and absorb oil, tar balls or other contaminant/residue above and below the edge of the shore line and is anchored/secured to a fence post with no flotation/corkboards as would apply to all modules in this application category.
Figure 10A:
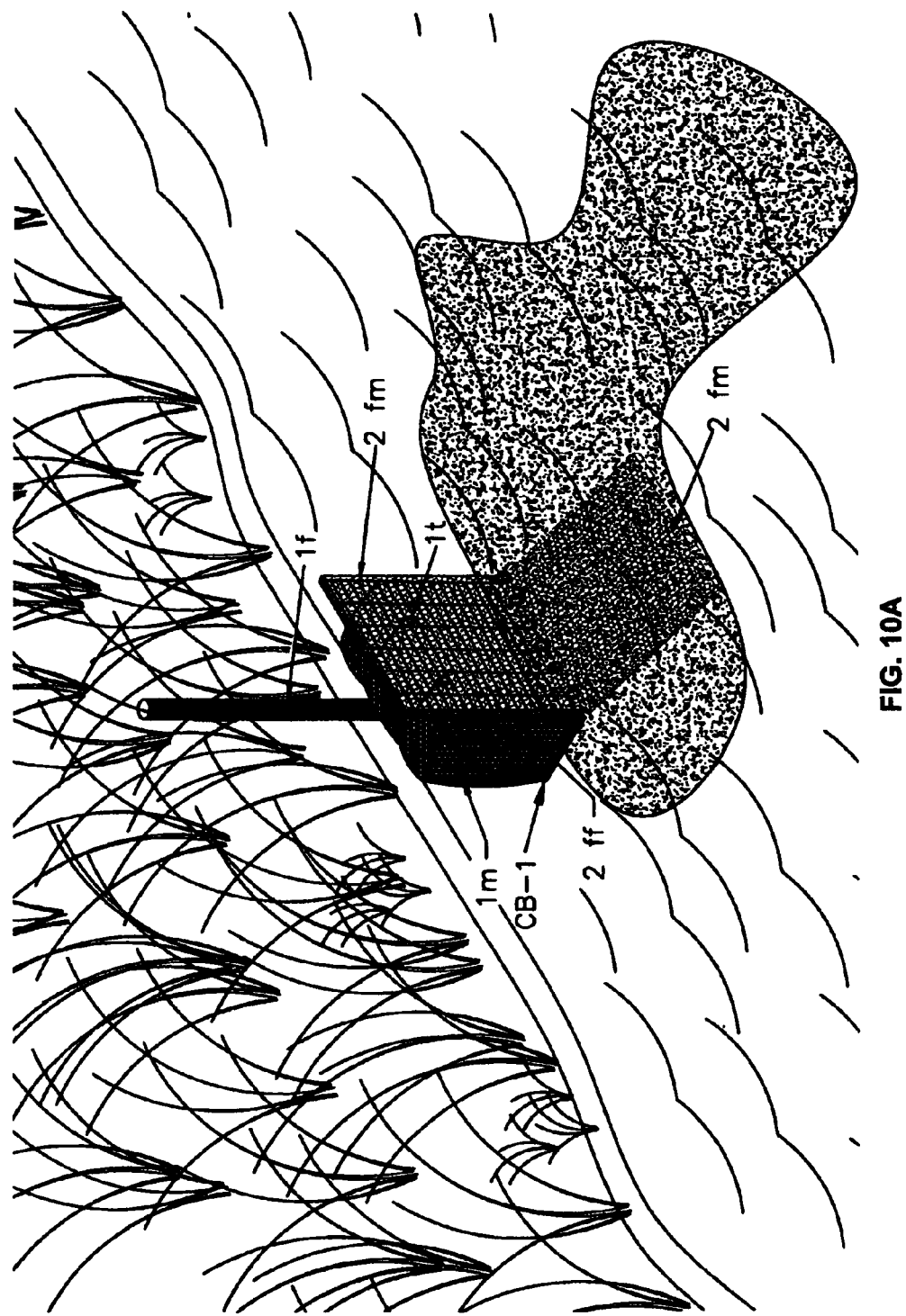
FIG. 10A Illustrates the module/apparatus of a similar design to FIG. 10, anchored/secured to a fence post adjacent to the shoreline, positioned in an area with more depth with the lower filter section fully extended to compensate for the prevention of oil, residues and tar balls going under the device and a 1 in. floatation/(CB-1) corkboard is included for this application.
Figure 10B:
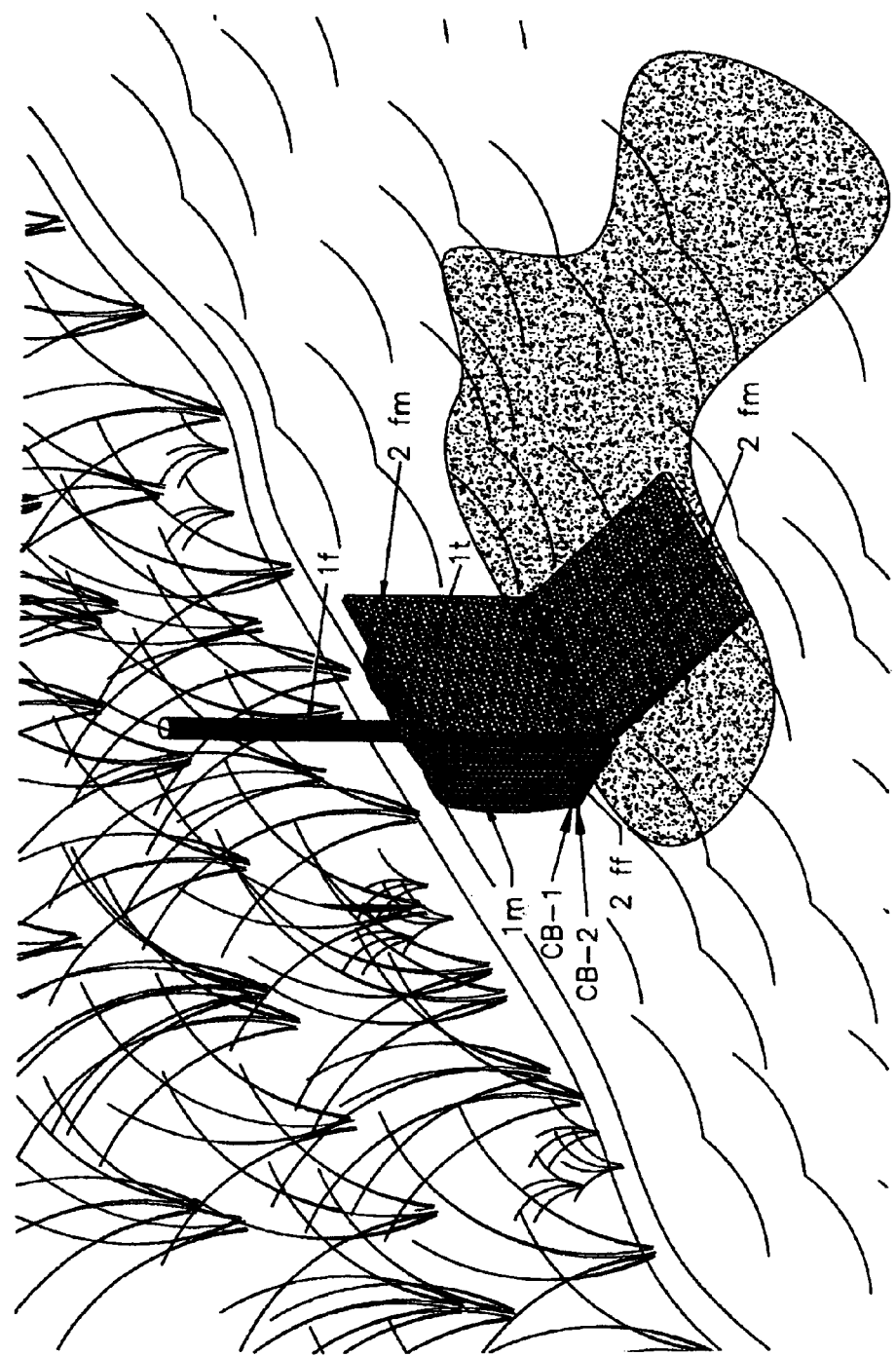
FIG. 10B Displays the apparatus/module as described in FIG. 10A with the lower filter section fully extended for an application with an even greater depth adjacent to the shoreline of the wetlands and incorporates both a CB-1 (1 in.) and CB-2 (additional 1 in.) corkboard floatation base/bottom.
Figure 11:
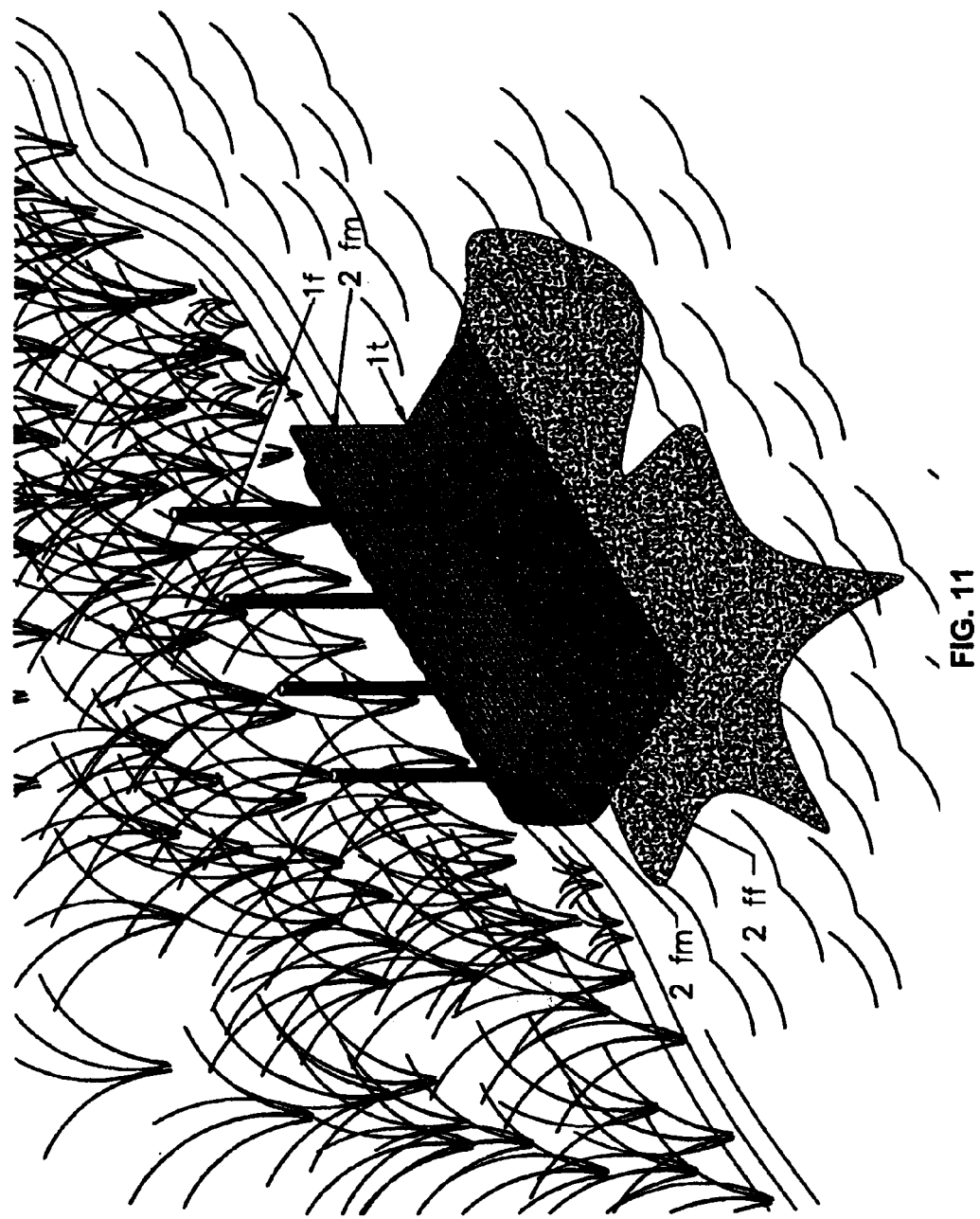
FIG. 11 Shows multiple apparatus/modules with filter racks and filters, extended to accommodate the slope of the shoals adjacent to the wetlands edge in minimum shallow water while anchored to fence posts to form a continuous wall for the prevention of intrusion of oil, contaminants and tar balls into the wetlands with no flotation device/corkboard is required for this application as per conditions dictated.
Figure 11A:
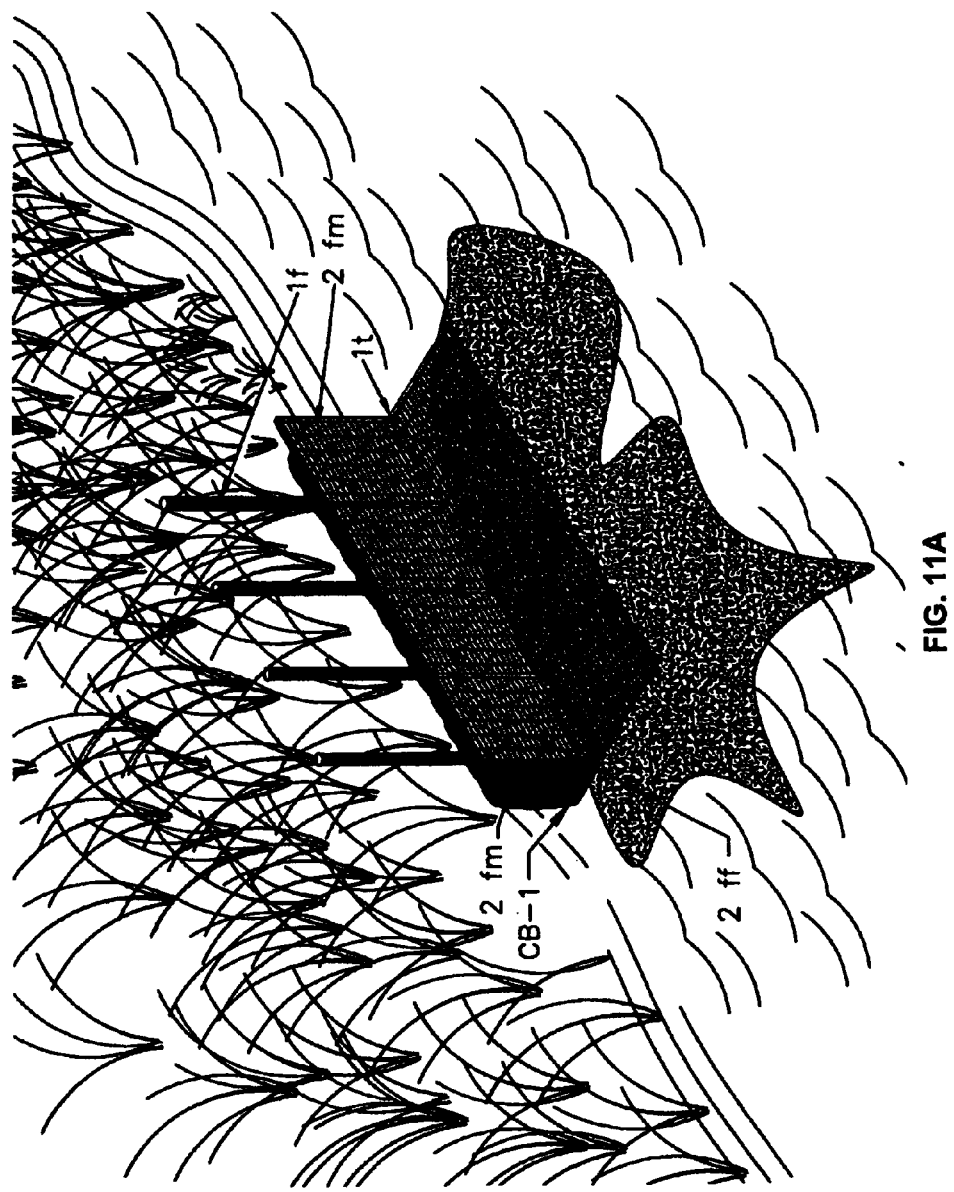
FIG. 11A Exhibits the similar apparatus/modules joined together to form a wall of protection against oil, contaminants and tar balls entering the wetlands adjacent to the shorelines and the fully extended filter racks with filters provide protection in greater depths applications that may exist in some areas which may also require a flotation corkboard device CB-1 (1 in.).
Figure 11B:
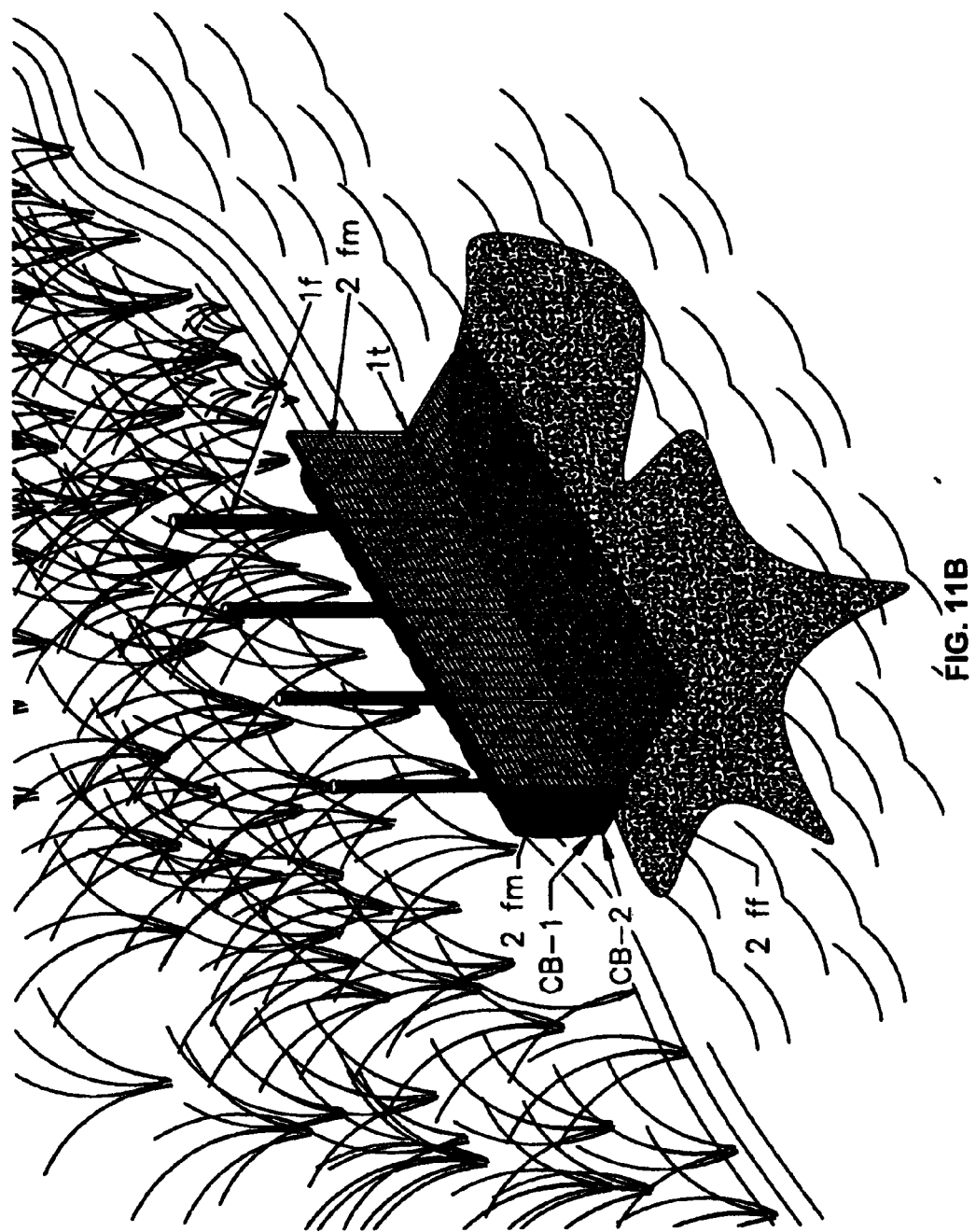
FIG. 11B Illustrates the types of modules/apparatus in FIGS. 11 and 11A, adjacent to the shorelines of wetlands, anchored/secured by fence posts in a setting that could require flotation devices CB-1 (1 in.) as well as C-B-2 (an additional 1 in.) corkboard for extended depths in some applications near the shore lines as required.

It is noted that the embodiments described herein in detail for exemplary purposes are of course subject to many different variations in structure, design, application and methodology. Because many varying and different embodiments may be made within the scope of the inventive concept (s) herein taught, and because many modifications may be made in the embodiments herein detailed in accordance with the descriptive requirements of the law, it is understood that the details herein are to be interpreted as illustrative and not in a limiting sense.

It should also be noted that the general rule is for anyone skilled in the subject matter should understand and allow for related improvements and changes that do not change the entire scope and objective of a new invention without a limiting challenge to its object and intention. The latter should include both Provisional and/or Utility patents.

The invention claimed is:

1. An apparatus employed to block, divert, absorb, filter and detoxify residual contaminants from an oil spill, said apparatus comprising:
   a plurality of rectangular Bermuda straw bale modules connected end-to-end to form a continuous floating barrier,
   wherein said Bermuda straw bale modules are encased within biodegradable burlap fabric wraps and secured by polytetraflouroethylene (PTFE) straps,
   wherein a first wire filter rack frame is attached to a vertical rectangular surface of each said Bermuda straw bale modules by a first set of PTFE ties affixed to said PTFE straps,
   wherein a second wire filter rack frame is attached to the bottom edge of the first wire filter rack frame by a second set of PTFE straps, said second set of PTFE straps operable as a hinge mechanism, wherein said second wire filter rack frame hangs vertically below said first wire filter rack frame and is free to rotate away from the vertical disposition,
   wherein replaceable filters are inserted into the first and second wire filter rack frames, said filters comprising a filter medium of the type able to absorb and trap said contaminants.

2. The apparatus of claim 1 wherein the wire rack frames are constructed to allow the filter media to be inserted or removed after deployment of the barrier without disassembling the apparatus into individual modules.

* * * * *